(12) United States Patent
Lee

(10) Patent No.: US 10,978,045 B2
(45) Date of Patent: Apr. 13, 2021

(54) FOREIGN LANGUAGE READING AND DISPLAYING DEVICE AND A METHOD THEREOF, MOTION LEARNING DEVICE BASED ON FOREIGN LANGUAGE RHYTHM DETECTION SENSOR AND MOTION LEARNING METHOD, ELECTRONIC RECORDING MEDIUM, AND LEARNING MATERIAL

(71) Applicant: MGLISH Inc., Seoul (KR)

(72) Inventor: Man Hong Lee, Seoul (KR)

(73) Assignee: MGLISH INC., Seoul (KR)

( * ) Notice: Subject to any disclaimer, the term of this patent is extended or adjusted under 35 U.S.C. 154(b) by 229 days.

(21) Appl. No.: 15/774,086

(22) PCT Filed: Nov. 25, 2015

(86) PCT No.: PCT/KR2015/012741
§ 371 (c)(1),
(2) Date: May 7, 2018

(87) PCT Pub. No.: WO2017/082447
PCT Pub. Date: May 18, 2017

(65) Prior Publication Data
US 2018/0330715 A1    Nov. 15, 2018

(30) Foreign Application Priority Data

Nov. 11, 2015  (KR) .......................... 10-2015-0157953
Nov. 23, 2015  (KR) .......................... 10-2015-0163887
Nov. 25, 2015  (KR) .......................... 10-2015-0165310

(51) Int. Cl.
*G10L 15/02*     (2006.01)
*G09B 19/06*    (2006.01)
*G09B 5/06*      (2006.01)
*G06F 40/20*    (2020.01)
*G10L 15/00*    (2013.01)
*G10L 15/05*    (2013.01)

(52) U.S. Cl.
CPC .............. *G10L 15/02* (2013.01); *G06F 40/20* (2020.01); *G09B 5/06* (2013.01); *G09B 19/06* (2013.01);
(Continued)

(58) Field of Classification Search
CPC .......................... G10L 40/40; G10L 15/00–21
See application file for complete search history.

(56) References Cited

U.S. PATENT DOCUMENTS

2003/0040899 A1* 2/2003 Ogilvie .................. G06F 40/58
                                                                            704/2
2004/0243416 A1  12/2004 Gardos
(Continued)

FOREIGN PATENT DOCUMENTS

CN     103218924 A     7/2013
KR     20020044690 A   6/2002
(Continued)

OTHER PUBLICATIONS

International Search Report (ISR) dated Jul. 22, 2016, for PCT/KR2015/012741.

*Primary Examiner* — Michael N Opsasnick
(74) *Attorney, Agent, or Firm* — Bacon & Thomas, PLLC

(57) ABSTRACT

A foreign language reading and displaying device and a method thereof, a motion learning device based on a foreign language rhythm detection sensor and a motion learning method, includes generating the phonemes corresponding to a syllable of the separated foreign language phonemes into one native language phonemes from among consonants and vowels in accordance with a predetermined pronunciation rules, combining the generated native language phonemes in accordance with a foreign language combination rules to generate and display native language syllables, words, and sentences, and displaying a part of the separated foreign language phonemes not corresponding to a syllable of a (Continued)

foreign language word as a foreign language phoneme according to a predetermined foreign language pronunciation rule; and displaying at least one of the native language sentence and the inputted foreign language sentence on a screen.

19 Claims, 10 Drawing Sheets

(52) U.S. Cl.
CPC ............ *G10L 15/005* (2013.01); *G10L 15/05* (2013.01); *G10L 2015/025* (2013.01); *G10L 2015/027* (2013.01)

(56) References Cited

U.S. PATENT DOCUMENTS

| | | | |
|---|---|---|---|
| 2007/0179779 A1* | 8/2007 | Kagoshima | G06F 40/42 704/10 |
| 2008/0274443 A1* | 11/2008 | Lemons | G09B 19/06 434/157 |
| 2009/0055158 A1* | 2/2009 | Xu | G10L 19/0018 704/2 |
| 2012/0288833 A1* | 11/2012 | Ridgeway | G09B 5/14 434/156 |
| 2013/0143183 A1* | 6/2013 | Zilberman | G09B 19/08 434/157 |
| 2013/0226583 A1* | 8/2013 | Kadirkamanathan | G10L 15/005 704/254 |
| 2013/0253909 A1* | 9/2013 | Bhattacharya | G10L 17/26 704/9 |
| 2016/0275075 A1* | 9/2016 | Yu | G06F 40/47 |

FOREIGN PATENT DOCUMENTS

| | | |
|---|---|---|
| KR | 20050032759 A | 4/2005 |
| KR | 20100029970 A | 3/2010 |

* cited by examiner

FIG.7
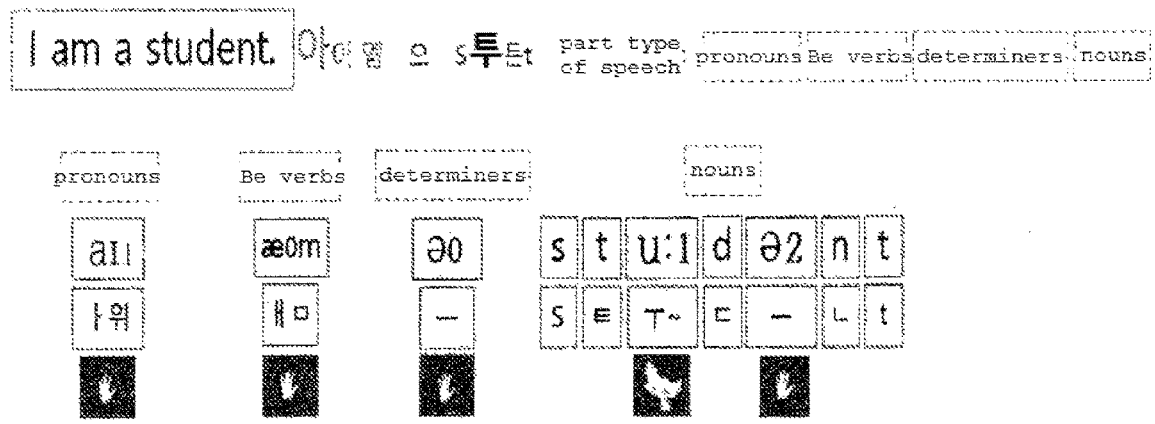
FIG.8
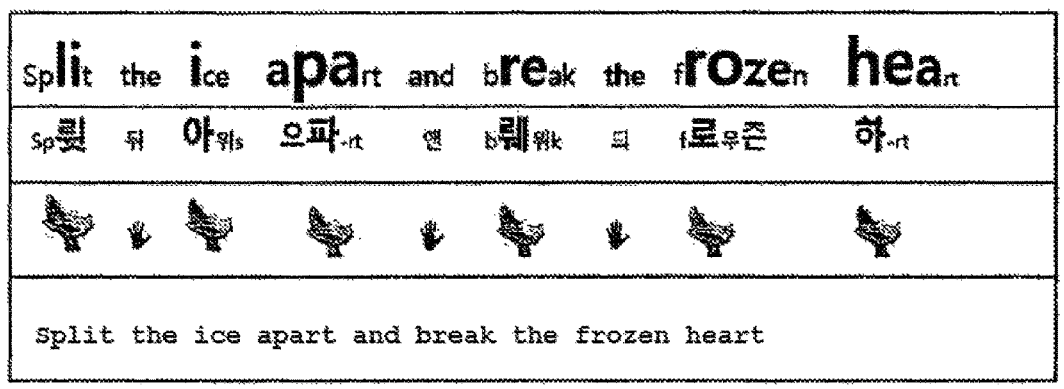
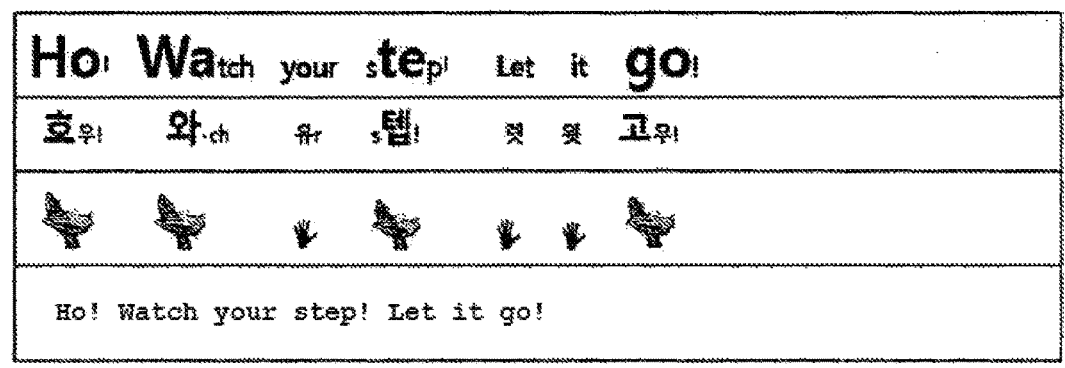

FIG.13

[pronunciations based on 8 tongue positions]

T1(Tongue 1) which is a below position of 'a', 'o', 'u', 'ə' 'I', which is a basic position T2(Tongue 2) which is behind the lower teeth for 's', 'z'

T3(Tongue 3) which is end of the upper molar for 'r'

T4(Tongue 4) which is the middle of the upper teeth for 'i', 'e', 'æ'

T5(Tongue 5) which is a front portion of the upper teeth for 'θ', 'ð'

T6(Tongue 6) for a back portion of the upper teeth for 'l'

T7(Tongue 7) which is in front of upper hard palate for 'd', 't', 'n'

T8(Tongue 8) which is back of the upper soft palate for 'k', 'g', 'ŋ'

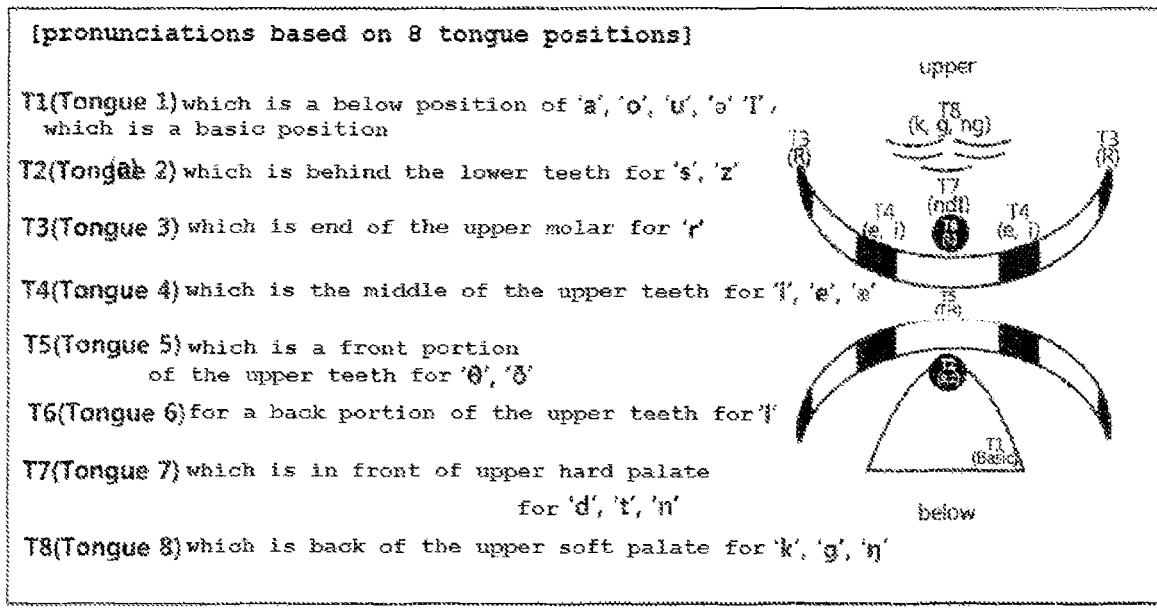

FIG.14

| words | s | i | t - u - | a - | t i o n |
|---|---|---|---|---|---|
| pronunc-iation | s | ɪ | tʃu | eɪ | ʃn |
| mouth motion | M8 | M3 | M4 | M2+M3 | M4 |
| tongue positions | T2 | T1 | T7+T4+T1 | T4+T1 | T4+T7 |
| hands motion | | ✋ | | 🖐 | |
| feet motion | | 👣 | | 👣👣 | |

FIG.15

| sentence | I | put | my | hands | on | my | knees |
|---|---|---|---|---|---|---|---|
| pronunciation | aɪ | put | maɪ | hænz | ɔ:n | maɪ | ni:z |
| mouth motion | M1+M3 | M6+M4 | M6+M1+M3 | M2+M8 | M5 | M6+M1+M3 | M2+M8 |
| tongue positions | T1 | T7 | T1 | T8+T4+T7+T2 | T1+T7 | T1 | T7+T4+T2 |
| hands motion | | | | | | | |
| feet motion | | | | | | | |

US 10,978,045 B2

FOREIGN LANGUAGE READING AND DISPLAYING DEVICE AND A METHOD THEREOF, MOTION LEARNING DEVICE BASED ON FOREIGN LANGUAGE RHYTHM DETECTION SENSOR AND MOTION LEARNING METHOD, ELECTRONIC RECORDING MEDIUM, AND LEARNING MATERIAL

FIELD OF THE INVENTION

The present invention relates to a foreign language reading and displaying device and a method thereof, and a motion learning device and a motion learning method based on a foreign language rhythm motion detection sensor using the same, and an electronic medium and a learning text material recorded thereon and, more particularly, to a motion learning device and a motion learning method based on a foreign language rhythm motion detection sensor, an electronic medium and a learning text material for providing an device and a method for converting a read sentence in a foreign language into a native language with a foreign language pronunciation, and enabling measuring and managing foreign language phoneme, syllable, and rhythm of foreign language through a motion detection sensor, sound detection sensor, and a vibration detection sensor so that a user may learn foreign language through procedural memory by motion learning instead of declarative memory by memorizing.

BACKGROUND OF THE INVENTION

Currently, globalization has been actively promoting exchanges of people around the world on and offline, and interest in foreign languages, such as English or other foreign languages, is increasing in order to facilitate communication. Languages have their own unique characters and pronunciations (sounds), so language acquisition is achieved by learning about the unique characters and pronunciations of the language. The characters themselves are clear and thus, there is no difficulty in learning characters, whereas, pronunciation is not clear and thus, three is a difficulty in learning pronunciation.

When all the languages of the world are analyzed, most of the characters have sound symbols. For example, as for the Japanese Hiragana, a character itself is a sound symbol; English and Chinese have a phonetic symbol as a sound symbol, and this phonemic symbol indicates the intrinsic sound of the language.

Therefore, in order to make pronunciation easier when learning a foreign language, it is necessary to learn the intrinsic sound of the character, that is, the sound of the phoneme symbol. However, most people are unable to pronounce a foreign language with the correct intrinsic sound because they process the intrinsic sound with the symbols or pronunciations of the native language when learning a foreign language, thus failing to pronounce foreign language correctly.

Recently, as the perception of the importance of pronunciation of foreign languages has been increasing, teaching/learning has been conducted by native speakers or instructors using pronunciation of a native speaker at a school, academy, or through communication media.

However, this method also has a low reliability in terms of accuracy of pronunciation due to a large difference in the level of pronunciation among a plurality of native speaker teachers or instructors. In addition, foreign language sound is acquired not by English phoneme symbols but by characters with meaning and thus, there is a problem that the learning to acquire accurate foreign language sound is delayed due to confusion with the existing education method.

Korean Laid-open Patent Publication No. 10-2003-0013993 discloses a service which displays translations and pronunciations in Korean way for foreign languages such as daily English or daily Japanese which people frequently use in daily lives.

However, it is true that the English language is not effective compared to the efforts of the learners who are not native speakers to familiarize themselves with the sounds of English, and the pronunciations are processed and displayed in the form of Hangul, and thus, there is a disadvantage that one cannot but use awkward Korean-style English.

To this end, it is necessary to develop a new concept of scientific English language teaching method marked in a native language so that one can understand English immediately regardless of the level of English or age or gender, by making full use of the athletic abilities of the cerebellum and language ability.

In addition, the necessity of more effective English learning method from the learner has been continuously demanded. According to the demand of the learner, a foreign language learning method based on foreign language spelling of a foreign language has been proposed. However, in case of a learning logic in Internet area, the notation does not exactly indicate sound to be heard and it is far from an actual foreign language pronunciation. Therefore, there has been a limitation that learning language effectively seems difficult.

Moreover, foreign language learning requires long periods of time, among which it is known that exposure to 5,000 hours is required to conquer listening. In other words, it takes more than 13 years even if one listens to foreign language one hour every day. Especially, when the foreign language is different from the native language, it is impossible to continue learning.

In order to listen to and speak a foreign language, the language information that can be converted into motion information needs to be stored in the cerebellum cortex. The cerebellum's athletic ability works at 10 Hz per second (10 vibrations per second), and English listening and speaking is similar to bike riding, so it must be stored in procedural memory through repetitive motion so that one can listen to and speak foreign language immediately.

Motion learning is characterized in that, if a learner learns language through motion learning, it is not forgot for a long time, but it takes a long time for a learner to memorize the language. Therefore, most of the learners who do not use English as their first language take a long time to memorize, thus failing to learn through motion learning.

In addition, since the existing English learning is done through grammar, reading, etc., the speed of response is slow and there is a limitation in speaking and listening to the conversation necessary for everyday life.

In order to overcome the existing problems in the short term, there has been a continued necessity to learn English by everybody more easily. The present applicant has had to develop a modeling capable of displaying foreign language pronunciation as it is and an algorithm that can display the corresponding foreign language pronunciation in their native language as it is on the display.

The need for learning methods that can overcome these existing problems in a short period of time and enable anyone to easily learn English has been constantly required in the learning field. Therefore, the present applicant had to develop an algorithm for modeling a pronunciation which can be displayed as a foreign language pronunciation, and an algorithm capable of displaying it in a native language

RELATED ARTS

1. STUDY SYSTEM USING REMOTE CONTROL MOBILE (Patent Application No. 10-2000-0073692)
2. A LANGUAGE STUDYING DEVICE (Patent Application No. 10-2008-0088696)

SUMMARY OF THE INVENTION

The present invention has been made to solve the above problems, and it is an object of the present invention, for learning foreign languages accurately, to provide a method and device for separating input foreign languages into words, dividing pronunciations of the separated words by phonemes using mglish phonetic alphabet (MPA), indicating accent, converting the pronunciations of the separated words into phonemes in native language according to a predetermined pronunciation rule, combining phonemes of native language according to the predetermined combination rule to generate syllable, words, and sentences in a native language. That is, the present invention provides a foreign language and native language notation technique and device using an English pronunciation symbol so as to display a native language as a pronunciation of a foreign language as it is.

Another object of the present invention is to provide a foreign language and native language notation technique and device using an English phonetic symbol so that the pronunciation accent of a separated foreign language can be reflected on syllables and words of the native language.

Another object of the present invention is to provide a foreign language and native language notation technique and device using English phonetic symbols that can display only syllables in syllable and words of native language among foreign language pronunciations separated by words.

The another object of the present invention is to provide a motion learning device based on the foreign language rhythm motion sensor and the motion learning method using the same so as to make a learner learn and respond through one's body easily, enthusiastically, and interestingly, and can measure and determine via a motion detection sensor, a sound detection sensor, and a vibration detection sensor.

In addition, the present invention relates to a motion learning device based on a foreign language rhythm motion detection sensor and a motion learning method using the same for stimulating the cerebellum, which is an exercise organ, by sensing the motion with a pronunciation of a foreign language, so that the neurotransmitter responsible for memory is continuously secreted for long term.

The present invention also provides a motion learning device based on a foreign language rhythm motion detection sensor and a motion learning method thereof so that a learner can be motivated continuously and the nature of human for craving victory can be combined with foreign language learning.

However, the objects of the present invention are not limited to the above-mentioned objects, and other objects not mentioned can be clearly understood by those skilled in the art from the following description.

In order to accomplish the above object, the foreign language reading and displaying device according to the present invention includes:

a foreign language input unit (100) for inputting a foreign language sentence;

a conversion server (300) for, after separating a foreign language sentence input from the foreign language input unit (100) into words, separating the separated foreign language word into phonemes using predetermined pronunciation symbols, generating the phonemes corresponding to a syllable of the separated foreign language phonemes into one native language phonemes from among consonants and vowels in accordance with a predetermined pronunciation rules, combining the generated native language phonemes in accordance with a foreign language combination rules to generate and display native language syllables, words, and sentences, and displaying a part of the separated foreign language phonemes not corresponding to a syllable of a foreign language word as a foreign language phoneme according to a predetermined foreign language pronunciation rule;

a display unit (500) for displaying at least one of the native language sentence and the inputted foreign language sentence of the conversion server (300) on a screen.

In the device, the conversion server (300) comprises:

a foreign language word separating unit (310) for separating input foreign language sentences into words;

a foreign language phoneme separating unit (320) for separating each of the foreign language words separated from the foreign language word separating unit (310) according to a predetermined foreign language phonetic symbol, and marking an accent; and a native language conversion unit (330) for matching pronunciation of the phoneme corresponding to the syllable of the foreign language word among the foreign language phonemes separated from the foreign language phoneme separating unit (320) to the pronunciation of one native language phoneme based on the predetermined pronunciation rule of the foreign language and the native language, and generating at the native language phoneme which is matched to the foreign language phonemes as at least one of syllables, words, and sentences of the native language based on the predetermined combination rules of a foreign language and transmitting the same to the display unit, and transmitting pronunciation of a phoneme not corresponding to a syllable of a foreign language syllable from among the separated foreign language phoneme to a display unit as a foreign language phoneme as it is according to a predetermined pronunciation rule.

In the device, the native language conversion unit (330) comprises:

a pronunciation rule analysis module (331) for outputting the pronunciation of a phoneme that does not correspond to a syllable of a foreign language word to a foreign language phoneme itself among the separated foreign language phonemes, and outputting pronunciation of a phoneme not corresponding to a syllable of a foreign language syllable from among the separated foreign language phoneme to a display unit as a foreign language phoneme as it is, a combination rule analysis module (332) for outputting a native language syllable combined with a consonant and a vowel matched to a foreign language syllable, and a native language output module (334) for outputting phonemes and syllables of the native language matched to the phonemes and syllables of the foreign language output from the combination rule analysis module (332) and transmitting the same to the display unit (500).

In the device, the pronunciation rule analysis module (331) outputs one native language phoneme from among consonants and vowels of native language matched with pronunciation of the phoneme of the foreign language, outputs only pronunciation of a phoneme corresponding to a syllable of a foreign language word from among the foreign language phonemes as a native language phoneme, and outputs pronunciation of a phoneme which does not correspond to a syllable of a foreign language from among the foreign language phonemes as a foreign language phoneme itself according to a predetermined foreign language pronunciation rule.

In the device, the native language conversion unit (330) may further include a rhythm rule analysis module (333) that reflects the accent included in the pronunciation of the syllable of the foreign language inputted according to the predetermined rhythm rule in the native language syllable of the combination rule analysis module (332).

In the device, the rhythm rule analysis module (333) is provided to reflect the accent included in pronunciation of the input foreign language syllable to a native language syllable, word, and sentence according to a predetermined rhythm rule and to transmit the same to the native language output module.

In the device, the native language output module (334) changes at least one of a specific shape, a font size and a color of a syllable and a word to which at least one rhythm rule is reflected from among syllables of native language which is matched to an input foreign language sentence and foreign language syllable to a predetermined setting value and display the same on a screen.

In the device, the conversion server (300) further comprises a foreign language conversion unit (340) to transmit to the display unit (500) a foreign language syllable portion of each foreign language word separated from the foreign language word separating unit (310) so that the portion is displayed to be visually distinctive.

In the device, the foreign language conversion unit (340) comprises a syllable analysis module (341) which extracts and outputs a syllable from each foreign language word separated from the foreign language word separating unit (310) and a foreign language output module (342) which transmits to the display unit the extracted foreign language syllable to be displayed visually distinctive.

In the device, the display unit (500), when transformation of the native language and a foreign language is displayed, applies a rule which passes the conversion server as it is, and if each word is combined to show a meaning or becomes a sentence, separates the sentence to a functional word and a keyword distinctively.

In the device, the keyword is anyone of a noun, a main verb, adjective, adverb, and exclamation to which a conversion rule is applied as it is, and the functional word is anyone of a pronoun, preposition, auxiliary verb, be verb, determiner, and conjunction, and at least one of a specific shape, a font size, and a color is changed to a predetermined setting value and displayed on a screen.

Also, in order to accomplish the above object, the conversion server of the foreign language reading and displaying device according to the present invention comprising:

a foreign language word separating unit (310) for separating input foreign language sentences into words;

a foreign language phoneme separating unit (320) for separating each of the foreign language words separated from the foreign language word separating unit according to a foreign language phoneme rule for a predetermined foreign language pronunciation and marking an accent; and a native language conversion unit (330) for matching pronunciation of the phoneme corresponding to the syllable of the foreign language word among the foreign language phonemes separated from the foreign language phoneme separating unit to the pronunciation of one native language phoneme based on the predetermined pronunciation rule of the foreign language and the native language, and generating at the native language phoneme which is matched to the foreign language phonemes as at least one of syllables, words, and sentences of the native language based on the predetermined combination rules of a foreign language and transmitting the same to the display, and transmitting pronunciation of a phoneme which does not correspond to a syllable of a foreign language word from among the separated foreign language phoneme to the display as the foreign language phoneme itself according to a predetermined foreign language pronunciation rule.

In the conversion server, the native language conversion unit 330 comprises:

a pronunciation rule analysis module (331) for outputting one native language phoneme from among consonants and vowels of native language matched with pronunciation of the phoneme of the foreign language according to a predetermined phonetic symbol and outputting the pronunciation of a phoneme that does not correspond to a syllable of a foreign language word to a foreign language phoneme itself among the separated foreign language phonemes;

a combination rule analysis module (332) for outputting a native language syllable combined with a consonant and a vowel matched to a foreign language syllable according to the predetermined combination rule; and a native language output module (334) for outputting phonemes and syllables of the native language matched to the output phonemes and syllables of the foreign language and transmitting the same to the display unit (500).

In the conversion server, the pronunciation rule analysis module (331) outputs one native language phoneme from among consonants and vowels of native language matched with pronunciation of the phoneme of the foreign language, outputs only pronunciation of a phoneme corresponding to a syllable of a foreign language word from among the foreign language phonemes as a native language phoneme, and outputs pronunciation of a phoneme which does not correspond to a syllable of a foreign language from among the foreign language phonemes as a foreign language phoneme itself according to a predetermined foreign language pronunciation rule.

Also, in order to accomplish the above object, the method for reading and displaying a foreign language according to the present invention comprising:

an inputting step of inputting a foreign language sentence;

a converting step of, after separating a foreign language sentence input from the inputting step into words, separating the separated foreign language word into phonemes using predetermined pronunciation symbols, generating the phonemes corresponding to a syllable of the separated foreign language phonemes into one native language phonemes from among consonants and vowels in accordance with a predetermined pronunciation rules, combining the generated native language phonemes in accordance with a foreign language combination rules to generate and display native language syllables, words, and sentences, and displaying a part of the separated foreign language phonemes not corresponding to a syllable of a foreign language word as a foreign language phoneme according to a predetermined foreign language pronunciation rule; and a displaying step of displaying at least one of the native language sentence generated by the converting step and the inputted foreign language sentence on a screen.

In the method, the converting step comprises:

a foreign language word separating step for separating the input foreign language sentences into words;

a foreign language phoneme separating step for separating each of the foreign language words separated from the foreign language word separating step into phonemes using phonetic symbol and marking an accent; and a native language converting step for matching pronunciation of the phoneme corresponding to the syllable of the foreign language word among the foreign language phonemes separated from the foreign language phoneme separating step to the pronunciation of one native language phoneme based on the predetermined pronunciation rule of the foreign language and the native language, and generating at the native language phoneme which is matched to the foreign language phonemes as at least one of syllables, words, and sentences of the native language based on the predetermined combination rules of a foreign language and transmitting the same to the display unit, and transmitting pronunciation of a phoneme not corresponding to a syllable of a foreign language syllable from among the separated foreign language phoneme to a display unit as a foreign language phoneme as it is according to a predetermined pronunciation rule.

In the method, the native language converting step comprises:

a first step for outputting the pronunciation of a phoneme that does not correspond to a syllable of a foreign language word to a foreign language phoneme itself among the separated foreign language phonemes, and outputting pronunciation of a phoneme not corresponding to a syllable of a foreign language syllable from among the separated foreign language phoneme to a display unit as a foreign language phoneme as it is;

a second step for outputting a native language syllable combined with a consonant and a vowel matched to a foreign language syllable; and a third step for outputting phonemes and syllables of the native language matched to the phonemes and syllables of the foreign language output from the first step and the second step and transmitting the same to the screen.

In the method, the second step comprises reflecting the accent included in a pronunciation of the syllable of the foreign language input according to the predetermined rhythm rule in the native language syllable.

In the method, the second step comprises reflecting the accent included in pronunciation of the input foreign language syllable to a native language syllable, word, and sentence according to a predetermined rhythm rule.

In the method, the second step comprises changing at least one of a specific shape, a font size and a color of a syllable and a word to which at least one rhythm rule is reflected from among syllables of native language which is matched to an input foreign language sentence and foreign language syllable to a predetermined setting value and displaying the same on a screen.

In the method, the converting step may further comprise a foreign language conversion step for displaying a foreign language syllable portion of each foreign language word separated in the foreign language word separating step so that the portion is displayed to be visually distinctive.

Also, in order to accomplish the above object, the present invention provides a computer readable medium comprising a command to perform each step according to the method for reading and displaying a foreign language.

Also, in order to accomplish the above object, the present invention provides an electronic medium including each step according to the method for reading and displaying a foreign language.

Also, in order to accomplish the above object, the present invention provides a learning material including each step visually according to the method for reading and displaying a foreign language.

Also, in order to accomplish the above object, the motion learning device based on a foreign language rhythm operation detection sensor according to the present invention comprising:

a sensor (610) for detecting voices and operations that express rhythm of a foreign language;

a data transceiver unit (620) which performs data transceiving of score information on an operation recognition that is detected by the sensor (610) and analyzed by the controller with a cloud server and wired/wireless PC and system by sensing information linkage;

a controller (630) for controlling the sensor (610) to detect voices and operations that express a foreign language rhythm, analyze and score voices and operations detected by the sensor (610), and include a voice recognition module (631), an operation recognition module (632), and an scoring application module (633); and a storage (640) for storing setting information for analyzing a phoneme, a syllable, and a sentence, detecting an operation, and storing information on an accent, a strong sound and a weak sound.

In the motion learning device, the voice recognition module (631) comprises:

a phoneme recognition means (631a) which recognizes and analyzes a movement of a mouth of a consonant and a vowel corresponding to a motion of speaking a phoneme of a learner, from the sensor (610);

a syllable recognition means (631b) for performing an analysis through recognition of a syllable movement of a learner by using a result of phoneme analysis according to a mouth shape and a tongue shape by the phoneme recognition means (631a); and a sentence recognition means (631c) for separating sentences that is a unit of communication where words that are analyzed by the syllable recognition means (631b) are combined into at least one word, extracting key factors of a sentence such as a noun, main verb, adjective, and adverb to set a strong note for emphasis, and set a functional elements as a weak note.

In the motion learning device, the phoneme recognition means (631a) analyzes eight M1 to M8 which correspond to a mouth shape type and eight T1 to T8 which correspond to a tongue position type.

In the motion learning device, the eight M1 to M8 which correspond to a mouth shape type is mouth 1 (M1) corresponding to pronunciation "a"; mouth 2 (M2) corresponding to "i" and "e"; mouth 3 (M3) corresponding to "I", "ə", "ʌ"; mouth 4 (M4) corresponding to "u"; mouth 5 (M5) corresponding to "o"; mouth 6 (M6) corresponding to "b", "p", and "m"; mouth 7 (M7) corresponding to "f" and "v"; and mouth 8 (M8) corresponding to "s" and "z".

In the motion learning device, the eight T1 to T8 corresponding to the tongue position type is tongue 1 (T1) which is a below position of "a", "o", "u", "ə", "I", which is a basic position; tongue 2 (T2) which is behind the lower teeth for "s" and "z"; tongue 3 (T3) which is end of the upper molar for "r"; tongue 4 (T4) which is the middle of the upper teeth for "I", "e", "æ"; tongue 5 (T5) which is a front portion of the upper teeth for "θ" and "d"; tongue 6 (T6) for a back portion of the upper teeth for "l"; tongue 7 (T7) which is in front of upper hard palate for "d", "t", and "n"; and tongue 8 (T8) which is back of the upper soft palate for "k", "g", and "ŋ".

In the motion learning device, the syllable recognition means (631b) separates syllables of words into "first accent" which pronounces a syllable strongly with an accent that is greater than or equal to a predetermined frequency, "second accent" which is weaker than the first accent", "syllable without strong or weak note", and "silent syllable" without sound, sets a first accent operation for "first accent" and a second accent operation for "second accent" to perform a movement by the first and second accent motions along with recognition into a mouth shape and a tongue position.

In the motion learning device, the motion recognition module (632) sets so that strong note motions such as clapping hands and standing with two feet which are greater than or equal to a standard value displayed on the X, Y, Z axis or a preset decibel (dB) is recognized by the sensor (610) with respect to the strong note that is set by the sentence recognition means (631c), and motions such as weak clapping less than a preset decibel (dB) and standing with one foot are recognized by the sensor (610) with respect to the weak note.

In the motion learning device, the operation recognition module (632) performs a function to stimulate the cerebellum by a strong note motion and a weak note motion stored in the storage (640) along with a mouth shape and a tongue shape that are analyzed by the phoneme recognition means (631a) so that a neurotransmitter which is in charge of memorizing continuously secretes for a memory to last long.

In the motion learning device, the scoring application module (633) detects a first accent motion and a second accent motion that are set by the syllable recognition means (631b) and a strong note motion and a weak note motion that are set by the sentence recognition means (631c) as a foreign language rhythm motion using the sensor (610) and utilizes the same.

In the motion learning device, the scoring application module (633) analyzes whether recognition is performed by the sensor (610) with respect to a first motion and a second motion that respectively match a first accent and a second accent of a word composed of phonemes that are set and recognized by the phoneme recognition means (631a) and a strong note motion and a weak note motion that respectively match a keyword and a functional word in a sentence where words are combined, and scores the same.

In the motion learning device, the sensor (610) comprises a "motion detection sensor", "sound detection sensor," and "vibration detection sensor" for detecting operations that express rhythm of a foreign language, and other means capable of detecting.

Also, in order to accomplish the above object, the motion learning device based on a foreign language rhythm motion detection sensor according to the present invention comprising:

a sensor for detecting voices and motions that express a foreign language rhythm; and a controller for controlling the sensor to detect all voices and motions that express a foreign language rhythm, analyzing and controlling all voices and motions detected by the sensor, and including a voice recognition module and a motion recognition module.

In the motion learning device, the voice recognition module comprises:

a phoneme recognition means for recognizing and analyzing a mouth shape of a vowel and a consonant that correspond to a phoneme motion of a learner from the sensor;

a syllable recognition means for performing analysis by recognizing a syllable motion of a learner utilizing a phoneme analysis result according to a mouth shape and a tongue shape by the phoneme recognition means; and a sentence recognition means for separating sentences that is a unit of communication where words that are analyzed by the syllable recognition means (631b) are combined into at least one word, extracting key factors of a sentence such as a noun, main verb, adjective, and adverb to set a strong note for emphasis, and set a functional elements as a weak note.

In the motion learning device, the motion recognition module sets so that strong note motions such as clapping hands and standing with two feet which are greater than or equal to a standard value displayed on the X, Y, Z axis or a preset decibel (dB) is recognized by the sensor with respect to the strong note that is set by the sentence recognition means, and motions such as weak clapping less than a preset decibel (dB) and standing with one foot are recognized by the sensor with respect to the weak note.

Also, in order to accomplish the above object, the motion learning device based on a foreign language rhythm motion detection sensor according to the present invention comprising a voice recognition module (631) which comprises;

a phoneme recognition means (631a) which recognizes and analyzes a movement of a mouth of a consonant and a vowel corresponding to a motion of speaking a phoneme of a learner, from the sensor (610);

a syllable recognition means (631b) for performing an analysis through recognition of a syllable movement of a learner by using a result of phoneme analysis according to a mouth shape and a tongue shape by the phoneme recognition means (631a); and a sentence recognition means (631c) for separating sentences that is a unit of communication where words that are analyzed by the syllable recognition means (631b) are combined into at least one word, extracting key factors of a sentence such as a noun, main verb, adjective, and adverb to set a strong note for emphasis, and set a functional elements as a weak note.

Also, the motion learning device further comprising:

a motion recognition module (632) configured to set so that strong note motions such as clapping hands and standing with two feet which are greater than a predetermined decibel (dB) is recognized by the sensor (610) with respect to the strong note that is set by the sentence recognition means (631c), and motions such as weak clapping less than a preset decibel (dB) and standing with one foot are recognized by the sensor (610) with respect to the weak note.

Also, the motion learning device further comprising:

a scoring application module (633) for detecting a first accent motion and a second accent motion that are set by the syllable recognition means (631b) and a strong note motion and a weak note motion that are set by the sentence recognition means (631c) as a foreign language rhythm motion using the sensor (610).

Also, in order to accomplish the above object, the motion learning method using a motion learning device based on a foreign language rhythm motion sensor according to the present invention comprising:

a first step for recognizing at least one sentence and motion from a learner by performing a motion of the sensor (610) by the motion learning device (600) based on a foreign language rhythm motion sensor; and a second step for recognizing and analyzing a mouth shape of a vowel and a consonant that correspond to a phoneme motion of a learner from the sensor (610) by the motion learning device (600) based on a foreign language rhythm motion sensor, and analyzing eight M1 to M8 corresponding to the mouth shape type and eight T1 to T8 corresponding to the tongue position type.

The method further comprising:

after the second step, a third step of, after separating recognized words to each syllable to perform analysis through recognition of a syllable motion of a learner by using a phoneme analysis result according to a mouth shape and a tongue shape by the motion learning device (600) based on a foreign language rhythm motion sensor, separating a word into "first accent" which pronounces a syllable strongly with an accent that is greater than or equal to a predetermined frequency, "second accent" which is weaker than the first accent", "syllable without strong or weak note", and "silent syllable" without sound; and a fourth step of the motion learning device (600) based on a foreign language rhythm motion sensor analyzing whether the first accent motion and the second accent motion for the "first accent" and the "second accent" matches the first accent and the second accent in at least one syllable included in words which are input from the sensor (610).

Also, the method further comprising:

after the fourth step, the fifth step of separating sentences that is a unit of communication where words that are analyzed are combined into at least one word, extracting key factors of a sentence such as a noun, main verb, adjective, and adverb to recognize a strong note for emphasis, and recognize a functional elements as a weak note; and the sixth step of determining by the motion learning device (600) based on a foreign language rhythm motion sensor whether the strong note motion is recognized by the sensor (610) simultaneously along with recognition on the strong note, and the weak note motion is recognized by the sensor (610) among with recognition on the weak note.

Also, the method further comprising:

after the sixth step, a seventh step of performing data transceiving by scoring the motion recognition by the motion learning device (600) based on a foreign language rhythm motion sensor with a cloud server and wired/wireless PC and system by sensing information linkage.

In the method, the first step comprises the motion learning device (600) based on a foreign language rhythm motion sensor recognizing sentences and motions so that phoneme rules, syllable rules, and rhythm rules that are applied to each level, situation, and country are different.

In the method, the first step comprises recognizing at least one sentence which includes languages of countries which use English as a mother tongue or all languages of countries which use English as a second language.

Also, in order to accomplish the above object, the present invention provides a computer readable medium comprising a command to perform each step according to the motion learning method using a motion learning device based on a foreign language rhythm motion sensor.

Also, in order to accomplish the above object, the present invention provides an electronic medium including each step according to the motion learning method using a motion learning device based on a foreign language rhythm motion sensor.

Also, in order to accomplish the above object, the present invention provides a learning material including each step visually according to the motion learning method using a motion learning device based on a foreign language rhythm motion sensor.

Also, in order to accomplish the above object, the learning material comprising:

a pronunciation rule unit which separates a foreign language pronunciation into a pronunciation which is separated based on a mouth shape and a pronunciation which is separated based on a tongue position; and a sentence expression unit which displays a rhythm image on a foreign language and a native language according to a pronunciation rule of the pronunciation rule unit and a preset rhythm rule; or wherein foreign language or native language is composed of sentences where a rhythm image according to accent is displayed.

In the learning material, the sentence expression unit comprises:

a foreign language expression unit in which each word that constitutes a foreign language sentence is disposed; a native language expression unit in which native language, or native language and foreign language are mixed to match the foreign language sentence; and a motion image expression unit so that the sentence disposed in the foreign language expression unit and the native language expression unit is corresponded to and matched with a rhythm image according to an accent.

In the learning material, the rhythm image is expressed by at least one of a different character font size, different color, different thickness of a character, and a specific shape, and wherein the motion image is expressed by at least one of a hand motion, a foot motion, and a body motion.

According to the present invention as described above, the native language can be displayed as the pronunciation of the read foreign language, and it is possible to acquire the foreign language accurately.

Also, the foreign language reading and displaying device and method according to the present invention can reflect the accent of a foreign language pronunciation into the syllable and words of the native language, and can display only the syllables of the foreign language pronunciation separated by words as the syllables and words of the native language. Therefore, there is the effect that one can pronounce a foreign language in a more convenient and easy way by the visual enhancement effect.

The motion learning device based on the foreign language rhythm motion sensor and the motion learning method using the same according to the present invention are capable of sensing a motion simultaneously with pronunciation of a foreign language and thereby stimulating the cerebellum, which is a motion organ, so that neurotransmitting substances are continuously secreted and memorized for a long time.

The motion learning device based on the foreign language rhythm motion sensor and the exercise learning method using the same according to the present invention can also provide a foreign language learning principle by which one can learn and respond through one's body easily, enthusiastically, and interestingly, and the effect of measuring and determining via a motion detection sensor, a sound detection sensor, and a vibration detection sensor.

Also, the motion learning device based on the foreign language rhythm motion sensor according to the present invention and the learning method using the same provide the effect of keeping a learner motivated and provoking competitiveness so that a learner's craving for winning victory can be combined with foreign language learning.

Further, the foreign language learning material according to the present invention provides an effect that a foreign language can be memorized for a long time through a foreign language learning principle by which one can learn foreign language by one's body easily, enthusiastically, and interestingly.

BRIEF DESCRIPTION OF THE DRAWINGS

Further objects and advantages of the invention can be more fully understood from the following detailed description taken in conjunction with the accompanying drawings in which:

FIG. 7 is a view describing an example of image conversion process of FIG. 4, FIG. 8 is a view illustrating input foreign language sentences and a state of displaying a native language and foreign language which are generated through the conversion server.

DETAILED DESCRIPTION OF THE INVENTION

Figure 1:
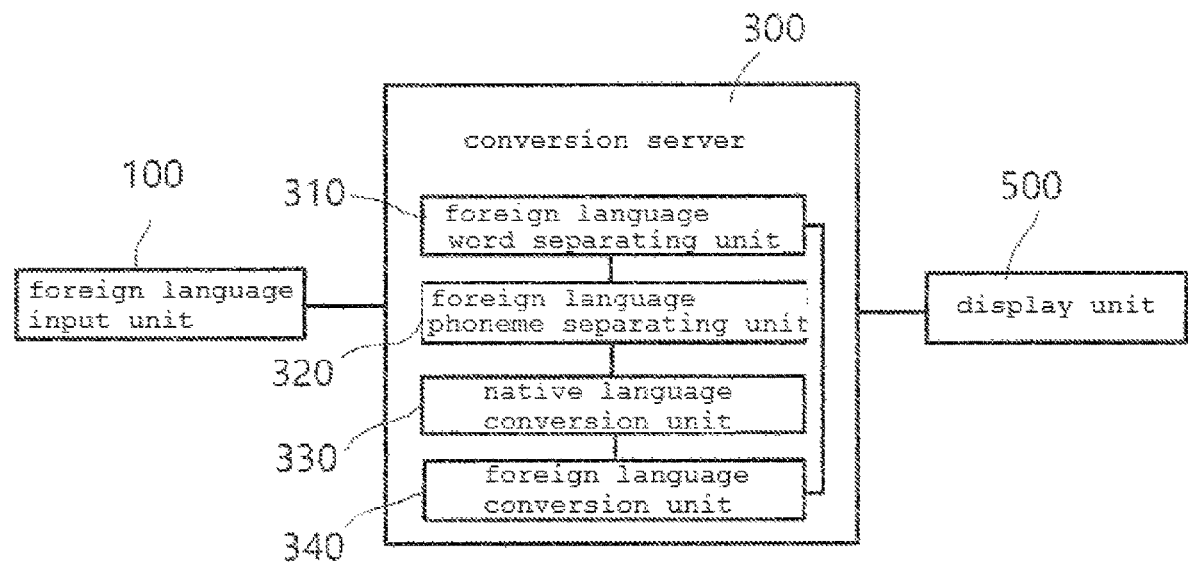
FIG. 1 is a schematic view of a configuration of a foreign language reading and displaying device according to an exemplary embodiment.

The preferred embodiments of the invention will be hereinafter described in more detail with reference to the accompanying drawings.

Embodiments of the present invention will be described in more detail hereinafter with reference to the accompanying drawings. The present invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and sizes of respective elements may be exaggerated for clarity.

Figure 2:
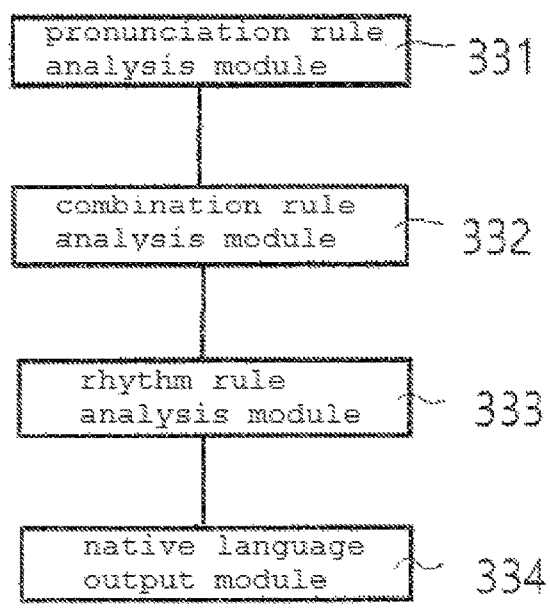
FIG. 2 is a schematic view of a configuration of a native language conversion unit of FIG. 1.
Figure 3:
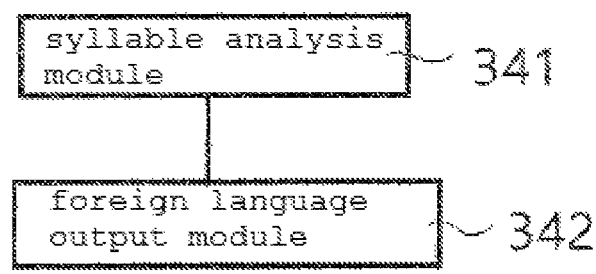
FIG. 3 is a schematic view of a configuration of a foreign language conversion unit of FIG. 1.
Figure 4:
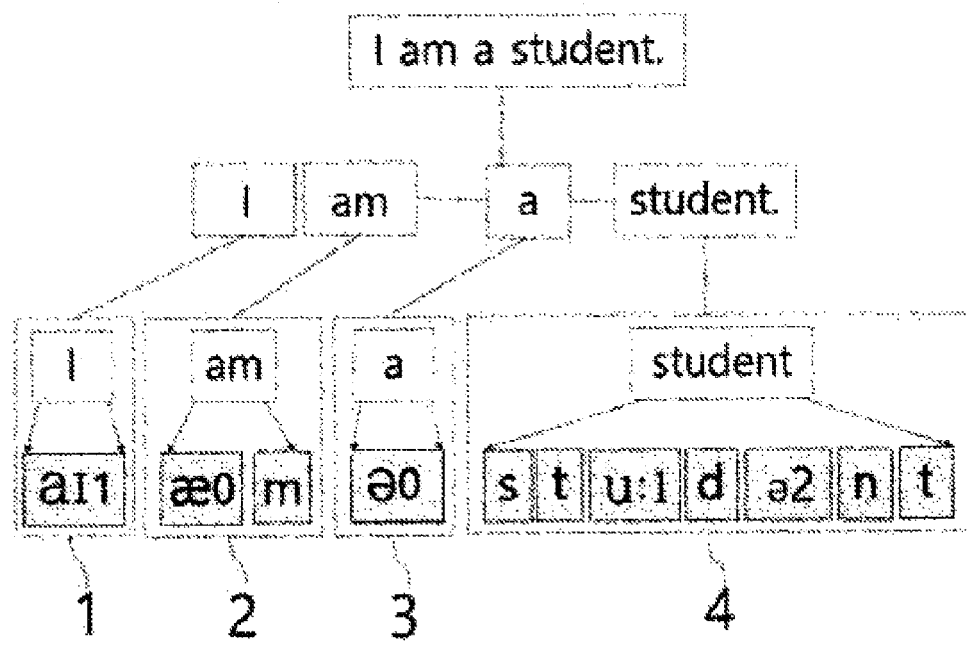
FIG. 4 is a schematic view of an operation order of a conversion server of FIG. 1.
Figure 5:
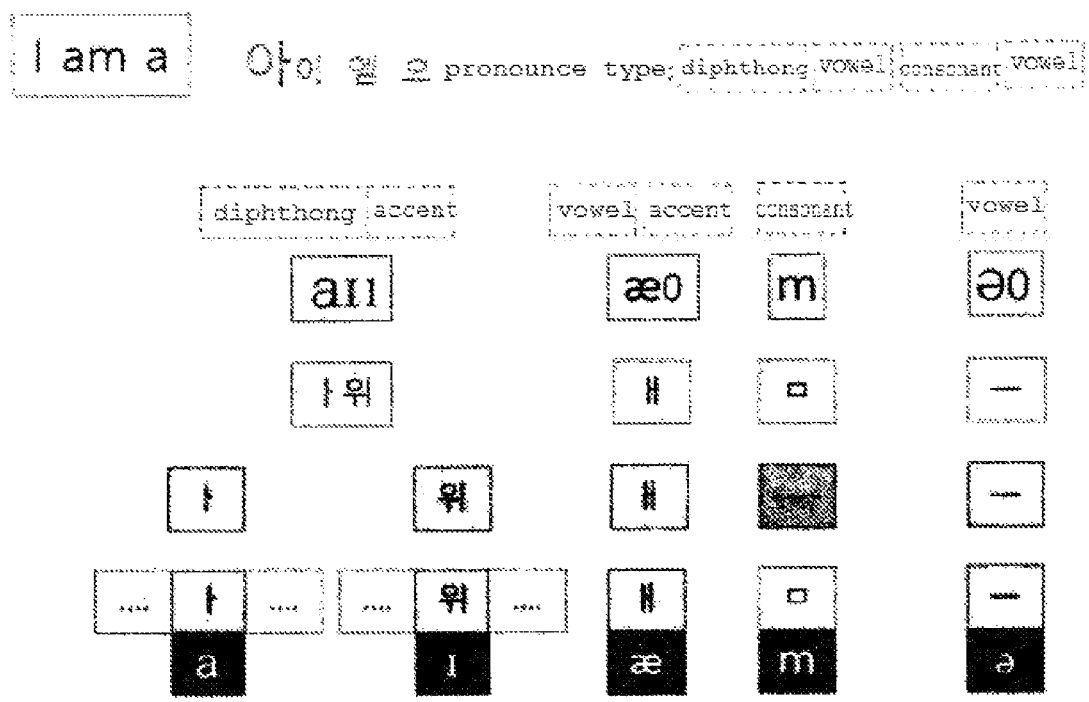
FIG. 5 is a view describing an example of native language conversion process with respect to 1, 2, and 3 of FIG. 4.
Figure 6:
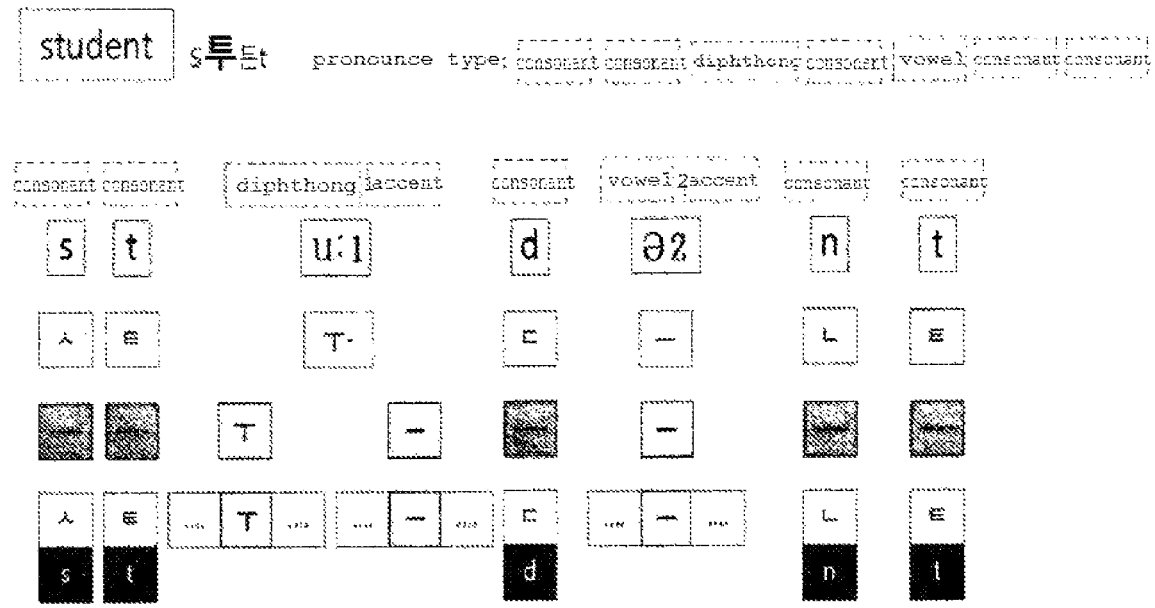
FIG. 6 is a view describing an example of native language conversion process with respect to 4 of FIG. 4.
Figure 9:
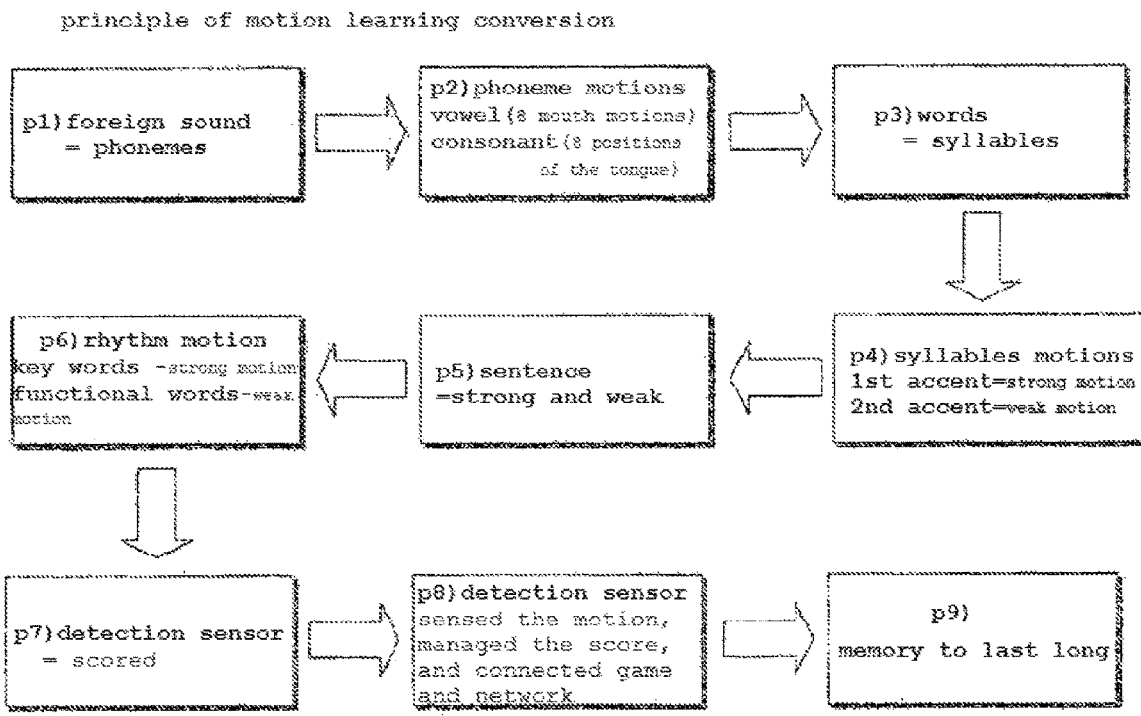
FIG. 9 is a brief view describing the principle of motion learning conversion in a motion learning device based on a foreign language rhythm motion detection sensor according to an exemplary embodiment.
Figure 10:
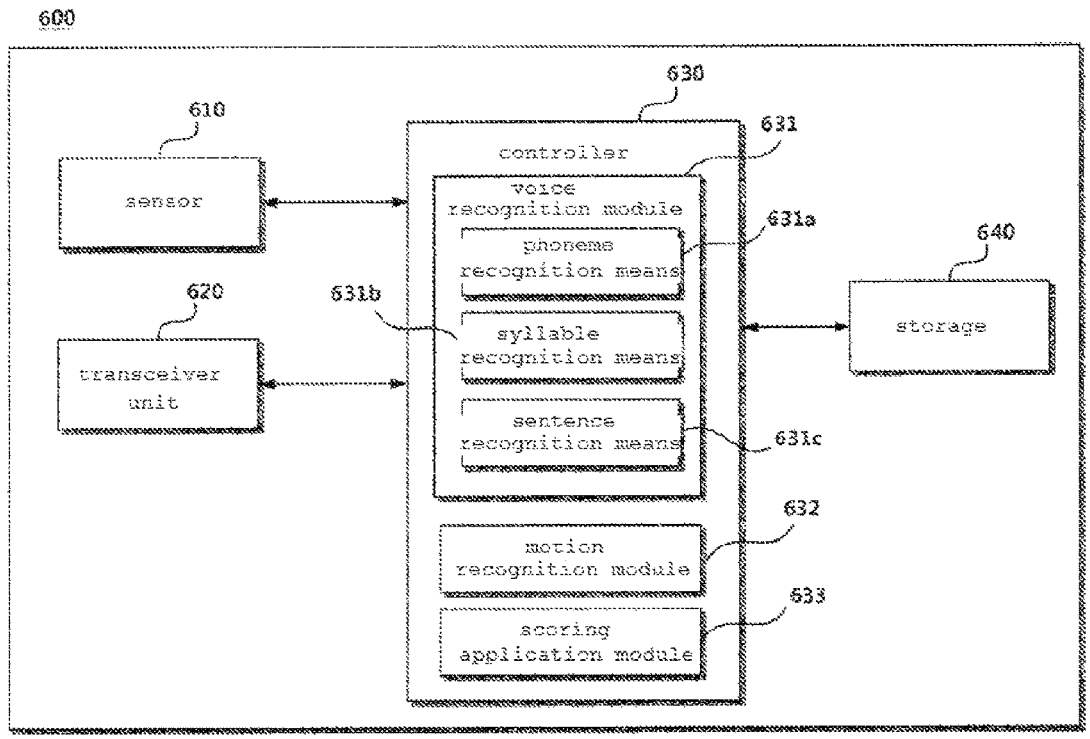
FIG. 10 is a block diagram describing a configuration of a motion learning device based on a foreign language rhythm motion detection sensor according to an exemplary embodiment.
Figure 11:
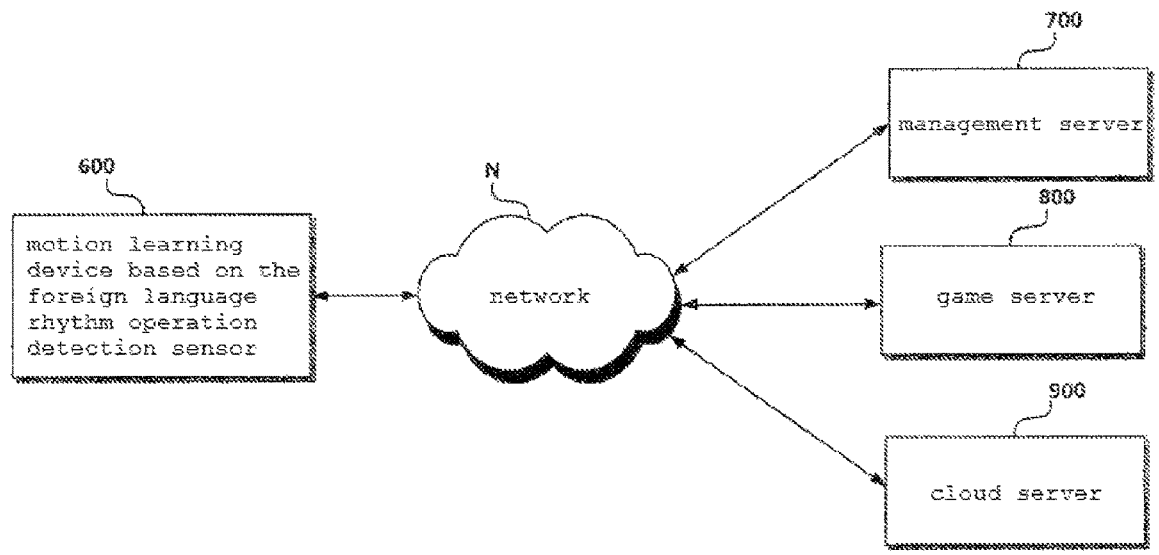
FIG. 11 illustrates a system which utilizes scored information by detection of foreign rhythm motion detection by a motion learning device based on a foreign language rhythm motion detection sensor of FIG. 10, FIGS. 12 to 15 are views to describe setting information for analyzing and detecting phonemes, syllables, and sentences in a motion learning device based on a foreign language rhythm motion detection sensor.
Figure 12:
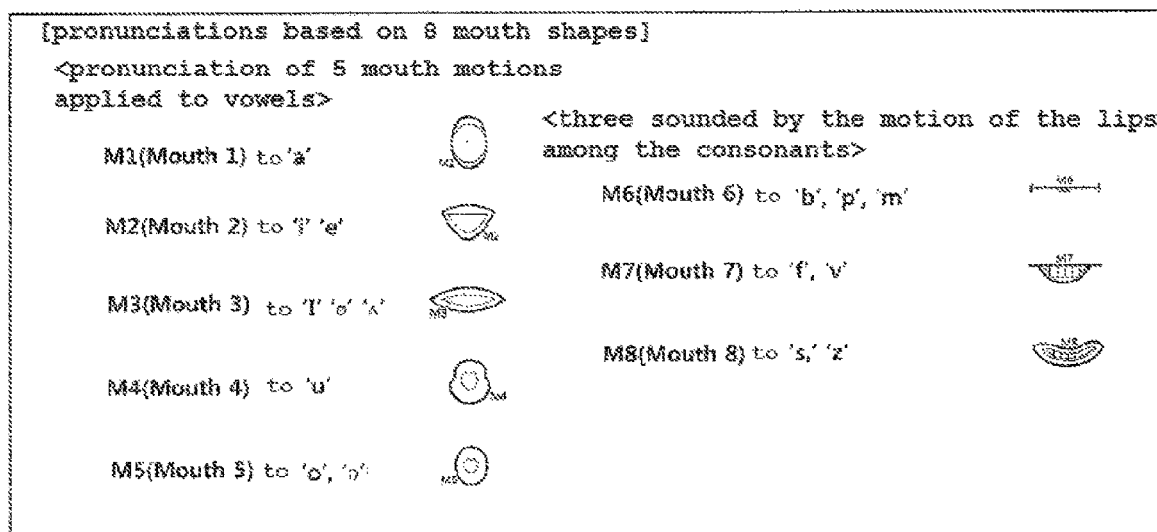
Figure 16:
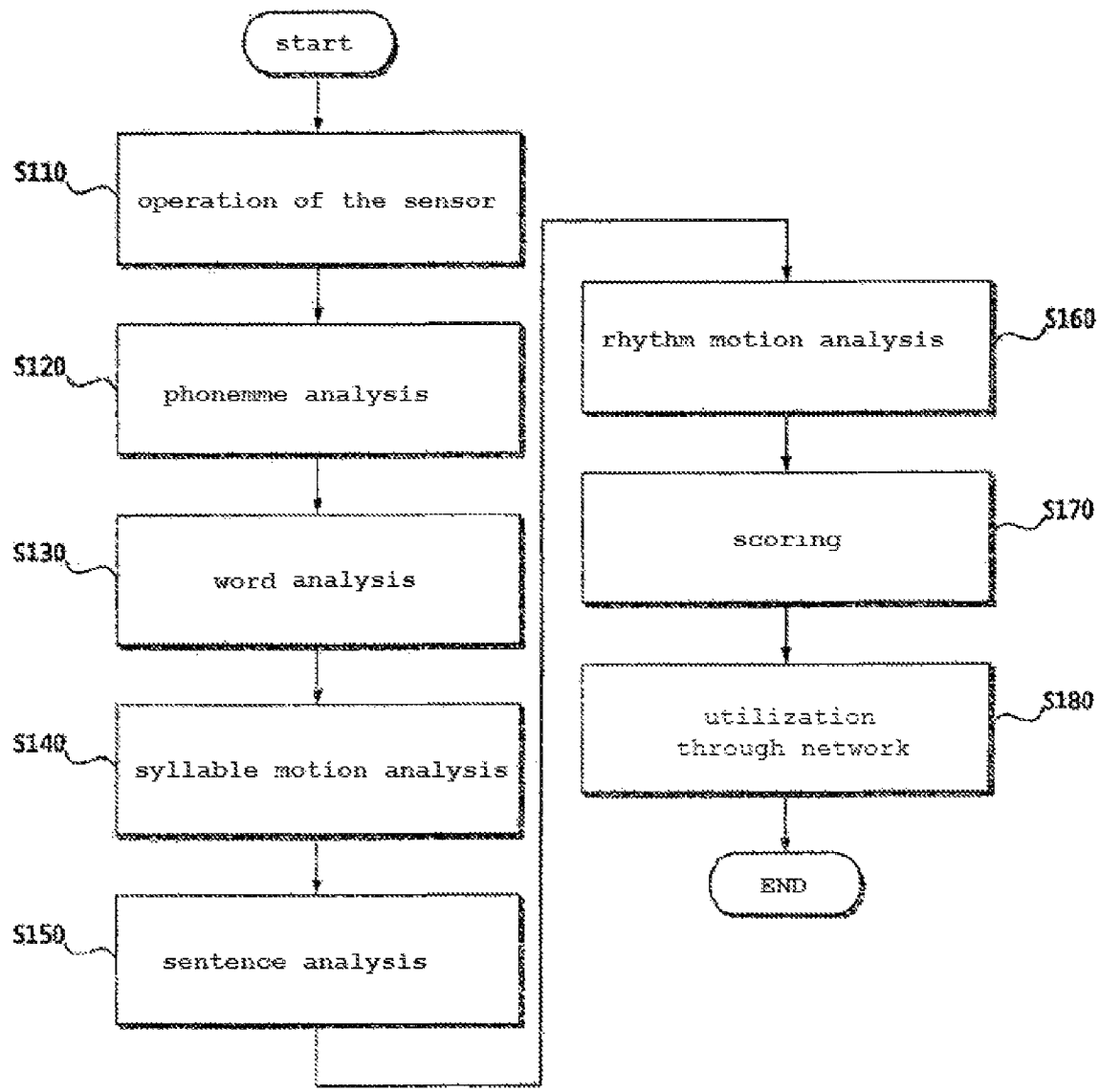
FIG. 16 is a flowchart describing a motion learning method using a motion learning device based on a foreign language rhythm motion detection sensor according an exemplary embodiment.
Figure 17:
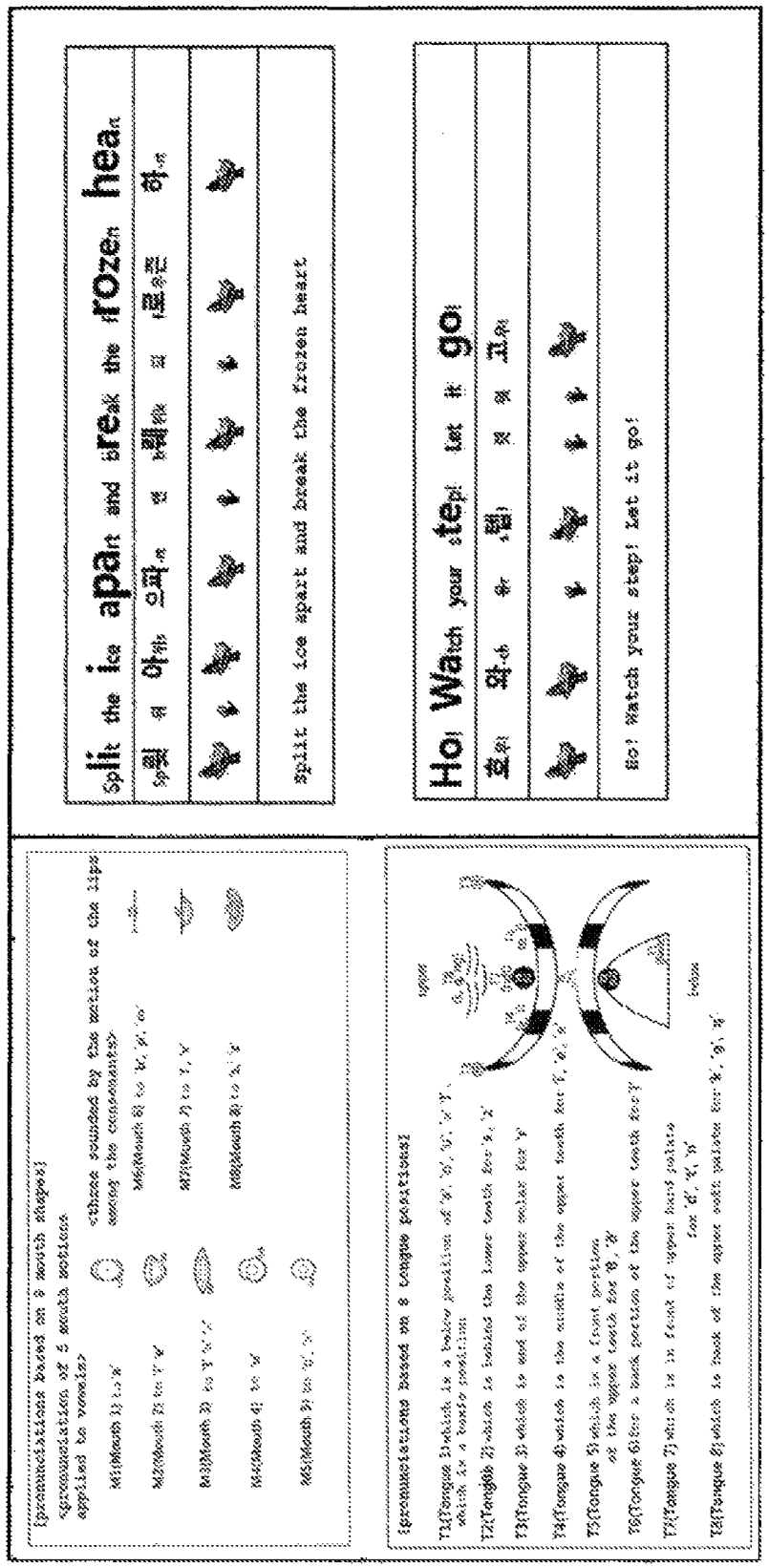
FIG. 17 is a schematic view describing a configuration of foreign language learning material according to an exemplary embodiment.

FIG. 1 is a schematic view of a configuration of a foreign language reading and displaying device according to an exemplary embodiment, FIG. 2 is a schematic view of a configuration of a native language conversion unit of FIG. 1, FIG. 3 is a schematic view of a configuration of a foreign language conversion unit of FIG. 1, FIG. 4 is a schematic view of an operation order of a conversion server of FIG. 1, FIG. 5 is a view describing an example of native language conversion process with respect to 1, 2, and 3 of FIG. 4, FIG. 6 is a view describing an example of native language conversion process with respect to 4 of FIG. 4, FIG. 7 is a view describing an example of image conversion process of FIG. 4, FIG. 8 is a view illustrating input foreign language sentences and a state of displaying a native language and foreign language which are generated through the conversion server, FIG. 9 is a brief view describing the principle of motion learning conversion in a motion learning device based on a foreign language rhythm motion detection sensor according to an exemplary embodiment, FIG. 10 is a block diagram describing a configuration of a motion learning device based on a foreign language rhythm motion detection sensor according to an exemplary embodiment, FIG. 11 illustrates a system which utilizes scored information by detection of foreign rhythm motion detection by a motion learning device based on a foreign language rhythm motion detection sensor of FIG. 10, FIGS. 12 to 15 are views to describe setting information for analyzing and detecting phonemes, syllables, and sentences in a motion learning device based on a foreign language rhythm motion detection sensor, FIG. 16 is a flowchart describing a motion learning method using a motion learning device based on a foreign language rhythm motion detection sensor according an exemplary embodiment, and FIG. 17 is a schematic view describing a configuration of foreign language learning material according to an exemplary embodiment.

The foreign language reading and displaying device according to an exemplary embodiment, as illustrated in FIGS. 1 to 8, includes a foreign language input unit 100, a conversion server 300, and a display unit 500 for separating input foreign language sentences into words for accurate acquisition of a foreign language; after separating the foreign language separated into words to phonemes using predetermined phonetic symbols, converting the separated foreign language pronunciation into native language phonemes and foreign phonemes according to a predetermined pronunciation rules, and combining the native language phonemes according to a predetermined combination rules to generate and display the native language syllables, words, and sentences.

Here, the foreign language input unit 100 may be provided be to retrieve a file (word, text, script, etc.) which has been already input as a foreign language sentence for loading the file, or input a foreign language sentence, may be implemented as one of a PDA having a voice recognition function, a mobile terminal, and a keypad, and the input foreign language is transmitted to the conversion server 300. At this time, it is needless to say that the inputted foreign language can have pronunciation or a video of a native speaker.

Also, in the present invention, Korean is used as an example of a native language, but the present invention is not limited thereto, and can be applied to all languages that do not use English as a first language, such as Japanese, Chinese, and the like.

The conversion server 300 separates the foreign language sentence input from the foreign language input unit 100 into words and separates the separated foreign language words into phonemes using a predetermined pronunciation symbol, generates a portion corresponding to a syllable of a foreign language from among the separated foreign language phoneme, into one native language phoneme from among the native language consonants and vowels according to a predetermined pronunciation rules, and then combines the generated native language phonemes according to a foreign language combination rules so as to generate and display a native language syllables, words, and sentences. At this time, among the separated foreign language phonemes, portions not corresponding to the syllables of the foreign language words may be provided so as to be displayed as foreign language phonemes according to predetermined pronunciation rules.

The conversion server 300 may include a foreign language word separating unit 310 for separating input foreign language sentences into words; a foreign language phoneme separating unit 320 for separating each of the foreign language words separated from the foreign language word separating unit according to a foreign language phoneme rule for a predetermined foreign language pronunciation; and a native language conversion unit 330 for matching pronunciation of the phoneme corresponding to the syllable of the foreign language word among the foreign language phonemes separated from the foreign language phoneme separating unit to the pronunciation of one native language phoneme based on the predetermined pronunciation rule of the foreign language and the native language, and generating at the native language phoneme which is matched to the foreign language phonemes as at least one of syllables, words, and sentences of the native language based on the predetermined combination rules of a foreign language.

At this time, the foreign language phoneme separating unit 320 may separate the foreign language words separated from the foreign language word separating unit into phonemes using a predetermined phonetic symbol, and indicate accent as well.

In addition, the native language conversion unit 330 transmits the pronunciation of phonemes not corresponding to the syllable of the foreign language word among the separated foreign language phonemes to the display unit as a foreign language phoneme itself according to predetermined foreign language pronunciation rules, so that both the native language and the foreign language are displayed at the same time.

The conversion server 300 may further include a foreign language conversion unit 340 for transmitting the foreign language syllable parts of the foreign language words separated from the foreign language word separation unit to the display unit so as to visually distinguish the foreign language syllable parts.

Here, the foreign language word separation unit 310 separates an input foreign language word in a unit, for example, in case of the sentence I am a student, it is separated into I, am, a, student.

Also, the foreign language phoneme separating unit 320 separates each of the foreign language words into phonemes using a predetermined phoneme rule or phonetic symbol (for example, MPA symbol). For example, mother is separated into m, o, t, h, e, and r. Alternatively, as shown in FIG. 4, I is separated into aI1; am is separated into æ and m; a is separated into ə0; and student is separated into s, t, u:1, d, ə2, n, and t. Here, "1" of u:1 indicates that there is a first accent to the phoneme, "0" of ə0 indicates that there is no accent in the corresponding phoneme, and "2" of ə2 indicates that there is the second accent in the corresponding phoneme.

In addition, the native language conversion unit 330 includes a pronunciation rule analysis module 331 for outputting the pronunciation of a phoneme that does not correspond to a syllable of a foreign language word to a foreign language phoneme itself among the separated foreign language phonemes, a combination rule analysis module 332 for outputting a native language syllable combined with a consonant and a vowel matched to a foreign language syllable, and a native language output module 334 for outputting phonemes and syllables of the native language matched to the output phonemes and syllables of the foreign language and transmitting the same to the display unit.

The native language conversion unit 330 may further include a rhythm rule analysis module 333 that reflects the accent included in the pronunciation of the syllable of the foreign language inputted according to the predetermined rhythm rule in the native language syllable of the combination rule analysis module 332.

Here, the pronunciation rule analysis module 331 generates one native language phoneme of the consonant and vowel of the native language matched with the phonetic pronunciation of the foreign language, or outputs one native language phoneme from among consonants and vowels of native language matched with pronunciation of the phoneme of the foreign language, outputs only pronunciation of a phoneme corresponding to a syllable of a foreign language word from among the foreign language phonemes as a native language phoneme, and outputs pronunciation of a phoneme which does not correspond to a syllable of a foreign language from among the foreign language phonemes as a foreign language phoneme itself according to a predetermined foreign language pronunciation rule.

For example, if "mother {məðə (r)}_언어" is written in native language, it is 'm_므+ə_어+d_두+ə(r)_어월" is combined to sound "머뒤얼", and as shown in FIG. 4 to FIG. 7, the "aI1"which is a diphthong is indicated as "ㅏ 위", "u:1" is "ㅜ-", and "θ0" is "ㅡ". Consonant m is indicated as "ㅁ", s is "s", t is "ㅌ", d is "ㄷ", n is "ㄴ", and t is "t". If it is expressed, 'I am a student' is '아위', 으, s ㅌ+ㅜ-+ㄷ+ㅡ+ㄴ+t"를 합한 "아위 으 s 두든 t".

That is, based on the pronunciation rule, a foreign language phoneme is converted into a native language phoneme and becomes a native language phoneme.

In some foreign language pronunciations, the phonemes of the native language are generated according to predetermined association rules, and the combination rules include known silent syllable rules, transformation rules, and prolonged sound rules.

Here, the silent syllable rules are as follows:

That is, 1) For example, if the similar pronunciations are encountered such as 'si(x)sence', the previous similar pronunciation is silenced. 2) For example, among foreign language words, s and weak pronunciation (T,B) between similar pronunciations such as 'leas(t) six', 'pus_h_ (h)is', 'gut s_ (t)o' is silenced. 3) When weak pronunciations (T,B) are connected, weak pronunciation is silenced; 4) when vowel is followed by vowel, former vowel is silenced. 5) For example, when a consonant follows T such as 'las(t) year', weak pronunciation (T,B) is silenced, but if a vowel comes after T, T is pronounced as a final consonance of a former vowel, 6) For example, in case of pronunciation L such as 'fi(l)m', 'I cou(l)d look', if a consonant follows, L is almost silenced, 7) For example, if an end of a word ends with d/t, as in 'an(d)', d/t is silenced, 8) For example, if the word starting with 'h' of 'he, him, his, her, have, has, here' etc comes after other word such as 'an(d) (h)is', (d/h) is silenced, 9) For example, such as 'the end of (th)eir', 'when (th)e', 'the sunsets (th)at', 'an(d) (th)ey're', the sound of the definite article 'the', personal pronoun 'they/them', and adverb 'there' are silenced by the ending sound of the preceding word, 10) For example, following the word which ends with '-ing' such as 'tryin(g) to be', there comes a consonant starting with t, g is silenced, 11) For example, in word starting with 'wh' such as 'w(h)en', h is silenced, 12) For example, when T or k comes after the syllable having an accent such as 'direc(t)ly, mos(t)ly, fac(t)s, as(k)ed', T or k is silenced, 13) For example, when two syllables without accent follows a pitch having an accent at the third syllable such as 'prob(a)bly, diff(i)cult, fam(i)ly, element(a)ry, particul(a)ry', one vowel from among the following syllables can be omitted or pronounced weakly (Schwi, Schwa, Schwu) to the extent not having a problem of delivering meaning. According to the aforementioned combination rules, phonemes of a native language are generated and output. 14) For example, in case of 'p(o)lice, p(e)r(h)aps, b(a)lloon', vowel (o,e,a) without an accent which comes in front of a syllable having an accent is not pronounced or pronounced as a weakened vowel (Schwi, Schwa, Schwu).

According to the silent syllable rules, phonemes of native language are generated from foreign language phonemes.

The transformation rules are as the follows, and based on these rules, native language syllable is generated from the separated phonemes.

1) For example, as in 'he wa(s) (ju)st, hi(s) (ch)eek, the(se) (i)ssues', if similar consonants and vowels are continued, they are pronounced together. 2) For example, the weak pronunciation T between the vowels is weakened by the pronunciation of R, as in pre(tt)y, 3) For example, in 'T+vowel+n' from among the weak pronunciation (T) such as 'moun(t)ain', <n> is pronounced as a nasal sound. 4) For example, if there is a vowel in front of a weak vowel T such as 'bu(t)', the final consonant/vowel is pronounced, 5) For example, if a strong sound N comes beside a weak sound T such as 'sen(t) in', it is transformed to N pronunciation, 6) if a pronunciation similar to M comes beside the weak pronunciation TH such as 'eat wi(th) me', D which is very weakened is pronounced, and exceptionally, from among weakened pronunciation such as 'win(d)ly', if a vowel comes after the D pronunciation, it is pronounced as it is, 7) For example, if a vowel comes after K/P such as 'bro(k)e u(p) at', K is pronounced as G, and P is pronounced as B, 8) For example, such as 's(tr)eet' and '(dr)eam', 'tr~' is pronounced as 'chu' and 'dr~' is pronounced as 'zhu'.

The prolonged sound rules are as follows, and a native language vowel is generated from a foreign language phoneme according to the prolonged sound rules.

1) When a consonant and a vowel meet, they are pronounced connectively. 2) When a vowel comes after a weakened pronunciation (T,B), it is pronounced as a prolonged sound (R is weakened between weak-pronounced vowels).

Based on such a combination rule, native language phonemes can be generated as native language phonemes, syllables, words, and sentences determined according to a predetermined rule for pronunciation of silent syllables, transformation, and prolonged sound.

The phonemes and syllables of the native language matching with the foreign language phonemes and the foreign language phonemes output from the pronunciation rule analysis module 331 and the combination rule analysis module 332 can be converted into a mixture of native language and foreign language and displayed on a screen.

In the meantime, the rhythm rule analysis module 333 is arranged to reflect the accent included in the pronunciation of the syllable of the inputted foreign language in the native language syllable, word and sentence generated according to the predetermined rhythm rule.

That is, the rhythm rule of the foreign language phoneme is as follows:

1) If the first and second accents are present, the first accent vowel portion and the vowel portion having an accent of two or more syllables are marked with strong beats.

2) A vowel port without more than one syllable accent is marked with one beat.

3) If there is a first or second accent, the second accent vowel portion and the second vowel coming the second in the one or more syllable are marked with a ½ beat.

4) The portion which corresponds to the second vowel u(우) of the dual vowel ou(오우) is represented the long vowel portion ":", and all consonants are marked with a quarter beat.

The native language phoneme is generated by reflecting the rhythm rule of the native language phoneme for the foreign language phoneme. The foreign language phoneme converted in accordance with the rhythm rule and the native language phoneme generated in correspondence with this rhythm rule may be displayed distinctively from the rest of the phonemes by various changes such as a font size, color, specific shape, and arrangement of font, etc. In the preferred embodiment of the present invention, the rhythm analysis is performed in the form of four types of beats (strong, one beat, half beat, and quarter beat), and phonemic representation may include various methods such as expressing in font size (accent-32 font, one beat-28 font, ½ beat-18 fonts, ¼ beat-10.5 fonts, or a certain percentage of font sizes that can identify changes) and various ways to visually represent changes such as color adjustment, a specific shape, and a font arrangement.

For example, in the case of "student", consonant s is 10.5 fonts, "tu" which includes phoneme of consonant t and vowel u with first accent and "튜" are 32 fonts; "den" and "든" which includes phoneme of consonant d, vowel e, and consonant n are 18 fonts; and phoneme of consonant t is marked as 10.5 fonts.

Meanwhile, the rhythm rules for foreign language syllables are set to be the same as the rhythm rules for foreign language phonemes.

The rhythm rules for the native language sentences to which accent of a foreign language accent is reflected are as shown below:

1) If there is a first accent in the content noun and if there is an accent in the words such as main verb, adjective, adverb, interrogative, directive pronoun, directive adjective, irregular abbreviation, a negative, e.g., never, not, and no etc, a strong beat is displayed.

2) In addition, if there is no accent on nouns, main verbs, adjectives, adverbs, interrogatives, directive pronouns, directive adjectives, irregular abbreviations, negatives such as never, not, and no etc, one beat is displayed.

3) If there is an accent in the functional words of the prepositions, conjunctions, personal pronouns, relative pronouns, articles, auxiliary verbs, and qualifiers, ½ beat is displayed.

4) If there is no accent in the functional words such as prepositions, conjunctions, personal pronouns, relative pronouns, articles, auxiliary verbs, and qualifiers, ¼ beat is displayed.

For example, in "Ho! Watch your step! Let it go", "Ho, Watch, step, go" has an accent. The rhythm analysis notation of a sentence can be visually displayed by various changes such as the font size of the foreign language and the native language, the color, a specific shape, and arrangement of font and so on.

In addition, when displaying the native language corresponding to the foreign language, only the syllable part of the foreign language can be expressed in the native language, and the remaining phonemes can be expressed in the foreign language.

That is, as shown in FIG. 8, in "Ho! Watch your step! Let it go", the exclamation "Ho" having an accent, syllable "Wa" of the main verb "Watch", syllable "te" of "step", and the main verb "go" are marked as 32 fonts; "you" of "your", "le" of "let", and "i" of "it" can be marked as 18 fonts. In addition, when marking as a native language, a foreign language and a native language can be used in a mixed way and this can be marked as "호우! 외-ch 유r s텝! 렛 잇 고우!"

In the rhythm rule analysis module 333, the native language sentence reflecting the predetermined rhythm rule is transmitted to the native language output module 334 in a mixed state of the foreign language and the native language, and the native language sentence in which a foreign language and a native language are mixed is displayed on a screen.

Also, the foreign language conversion unit 340 may include a syllable analysis module 341 for deriving a syllable from each foreign language word separated from the foreign language word separating unit and the foreign language output module 342 for transmitting the derived foreign language syllable to the display unit so as to be displayed visually distinctive.

The syllable derived from the foreign language conversion unit 340 and the syllable converted into the native language in the native language conversion unit 330 are matched with each other. The display unit 500 may display such that a foreign language word or sentence in which a syllable transmitted from the foreign language output module of the foreign language conversion unit is displayed to be visually distinctive is matched and corresponded to a native language word or sentence which is used in a mixed manner with a foreign language transmitted from the native language output module 334 of the native language conversion unit 330.

Consequently, when conversion of a native language and conversion of a foreign language are displayed on the display unit, each word that is a minimum unit of meaning is applied with the rule which has passed the conversion server, and when words are combined to show a meaning or become a sentence, the words are divided into a functional word and a keyword through analysis of parts of speech. That is, the conversion rule is applied to keywords such as nouns, main verbs, adjectives, adverbs, and exclamations, and functional words such as pronouns, prepositions, auxiliary verbs, Be verbs, determiners, and conjunctions are to be displayed on a screen by changing at least one of a specific shape, a font size, and a color to a predetermined setting value.

In case of the image notation expressing an accent, as illustrated in FIG. 7, each word that is a minimum unit of meaning is applied with the rule which has passed the conversion server as it is, and represents meaning of a first accent (1) portion, a second accent (2) portion, and a portion without accent (0) based on the syllable converted to native language and the syllable converted to foreign language through the native conversion unit 330 and the foreign language conversion unit 340. Here, hands, flat of hands, one foot, two feet, or other body parts, an image of a motion or a tool can be marked on a syllable portion.

According to the present invention, a foreign language is moved from a pronunciation close to a tooth in a mouth to a pronunciation of a larynx, and sequentially expressed in a native language to naturally learn the articulation point of pronunciation. In order to make the actual sound and the foreign language notation are the same, the actual sound of the foreign language and the notation of the native language are unified so that a user can learn language effectively.

In order to unify the notation of the actual sound of the foreign language and the native language, the input foreign language sentence is separated into words, syllables, and phonemes. Then, the separated foreign language phonemes are used to generate one native language phoneme from among vowels and consonants of native language according to the predetermined foreign language pronunciation rules and generate native language syllables, native language words, and native language sentences according to the predetermined combination rules. Here, from among the foreign language pronunciation, only syllables are marked with the native language, and foreign language corresponding to the rest of pronunciation is marked as it is without conversion.

The foreign language and native language display service using the phonetic symbol according to the embodiment of the present invention can be provided through a wired/wireless communication network. In this case, after accessing the web site and downloading the application program, one can download the corresponding application program and join the membership for using a service. These processes are well-known arts and thus, a detailed description thereof will be omitted.

First, the foreign language sentences input through the foreign language input unit 100 are separated by word units, and the separated foreign language words are separated by phonemes accented according to a predetermined phonetic symbol (for example, MPA symbol). Then, the separated foreign language phonemes with accent are transmitted to the pronunciation rule analysis module 331, and from among the separated foreign language phonemes, phonemes corresponding to syllables of a foreign language word are converted to one native language phoneme matched with pronunciation of foreign language phoneme and output, and the pronunciation which does not correspond to the syllable of a foreign language word from among the separated foreign language phonemes is output as the foreign language phoneme as it is.

Then, the native language phoneme is transmitted to the combination rule analysis module 342, and the combination rule analysis module 342 combines the native language consonants and vowels according to a predetermined combination rule, and then the combined native language syllables, words, and sentences are output.

The process is repeated for all the syllables included in the inputted foreign language sentence, the foreign language words including the syllable, and the foreign language sentences including the foreign language words, and the conversion process of the words and sentences of the foreign language syllables into native language words and sentences is the same and thus, the detailed description thereof will be omitted.

In the rhythm rule analysis module 333, in accordance with predetermined rhythm rules for the native language phonemes and syllables mixed with the foreign language phoneme provided from the pronunciation rule analysis module 331 and the combination rule analysis module 332, accents of pronunciation included in the foreign language phonemes, syllables, and words are reflected and the native language phonemes, syllables, and words are generated.

The native language sentence in a state where the foreign language and the native language are mixed is generated by the rhythm rule analysis module 333 and provided to the native language output module 334. The native language output module processes that the native language sentence in which the foreign language and the native language generated from the rhythm rule analysis module 333 are mixed is visually displayed using various methods such as a different character font, size, color, specific shape, and arrangement of fonts, etc.

At least one of the native language phonemes, syllables, words, and sentences in a state where foreign language phonemes of the native language output module 334 are mixed is displayed on the screen through the display unit 500.

Also, the foreign language syllable part derived from the foreign language word of the foreign language output module 342 is visually distinguished from the remaining foreign language word phonemes and is displayed on the screen through the display unit 500.

At this time, the foreign language words or sentences in which syllables transmitted from the foreign language output module 342 of the foreign language conversion unit 340 are visually distinguished are matched with and corresponded to the native language words or sentences which are mixed with foreign languages transmitted from the native language output module 334 of the native language conversion unit 330.

The motion learning device based on a foreign language rhythm motion detection sensor using a foreign language reading and displaying device and a motion learning method will be described with reference to FIGS. 9 to 16.

FIG. 9 is a schematic view describing a principle of motion learning conversion in a motion learning device 600 based on a foreign language rhythm motion sensor according to an embodiment of the present invention. Referring to FIG. 9, the principle of the motion learning conversion used in the motion learning device 600 based on the foreign language rhythm motion detection sensor will be described.

The minimum unit of sound constituting listening and speaking of a foreign language is called phonemes, and the phonemes are collected to be syllables. A syllable sounds as a combination of consonants and vowels or as vowels themselves. Syllables are gathered into words and words are gathered to become sentences. In foreign languages, there are intrinsic accents, prolonged sounds, and intonations that are different from native languages. The tone units should be distinguished well so that one can speak and listen rhythmically and naturally.

The vowel, which is a component of the phoneme (p1), is a sound of a mouth-shaped change, and a consonant is a sound of varying the articulation point of the tongue. Therefore, by combining five mouth motions that are applied to vowels and three sounds from a motion of lips from consonants, eight mouth motions and eight sounds from a position of the tongue can express vowels and consonants with mouth and tongue (p2).

One or more syllables combined with phonemes form words, the smallest unit of meaning (p3). The word is divided into a first accent that strongly pronounces the syllable, a second accent that is weakly pronounced, a syllable without accent, and a silent syllable (p4). Therefore, if the cerebellum is stimulated by the motions such as clapping hard and standing with two feet for the first accent and clapping hands and standing with one foot for the second accent, and a motion using a mouth and a position of the tongue, a neurotransmitter which is in charge of memorizing continuously secretes for a memory to last long.

Sentences, a unit of communication in which words are combined, have a strong note for emphasis, a prolonged note, an omission, an abbreviation, and an intonation (p5). Basically, key elements of a sentence such as nouns, main verbs, adjectives, and adverbs have a strong note, and functional elements have a weak sound. Therefore, if the cerebellum is stimulated (p6) by the motions such as clapping hard and standing with two feet for the first accent and clapping hands and standing with one foot for the second accent, and a motion using a mouth and a position of the tongue, a neurotransmitter which is in charge of memorizing continuously secretes for a memory to last long.

Between the process p6 and the process p9, a strong motion for the key words (n, v, a, ad) and a weak motion for the functional words (prep, con, . . . ) can be sensed by the sensor and scored (p7). This score can be managed, and game and network connection can be performed.

FIG. 10 is a block diagram describing a configuration of a motion learning device based on a foreign language rhythm motion detection sensor according to an exemplary embodiment, FIG. 11 illustrates a system which utilizes scored information by detection of foreign rhythm motion detection by a motion learning device based on a foreign language rhythm motion detection sensor of FIG. 10, FIGS. 12 to 15 are views to describe setting information for analyzing and detecting phonemes, syllables, and sentences in a motion learning device based on a foreign language rhythm motion detection sensor.

Referring to FIG. 11, the motion learning device 600 based on the foreign language rhythm operation detection sensor performs data transceiving with the management server 700, the game server 800, the cloud server 900, and the like.

Here, the network N is a communication network which is a high-speed period network of a large communication network capable of a large-capacity, long-distance voice and data service, and may be a next generation wired and wireless network for providing Internet or high-speed multimedia service. When the network N is a mobile communication network, it may be a synchronous mobile communication network or an asynchronous mobile communication network. As an embodiment of the asynchronous mobile communication network, a wideband code division multiple access (WCDMA) communication network is exemplified. In this case, although not shown in the drawings, the mobile communication network may include a radio network controller (RNC). Meanwhile, although the WCDMA network is used as an example, it may be a next generation communication network such as a 3G LTE network or a 4G network, or an IP network based on other IPs. The network N transmits signals and data between the motion learning device 600, the management server 700, the game server 800, the cloud server 900, and between systems based on the foreign language rhythm motion sensor.

Referring to FIG. 10, the motion learning device 600 based on the foreign language rhythm motion sensor includes a sensor 610, a transceiver unit 620, a controller 630, and a storage 640.

The sensor 610 is a unit for sensing a voice or an action expressing a foreign language rhythm and includes a motion detection sensor, a sound detection sensor, a vibration detection sensor, or any other detectable means.

Also, the transceiver unit 620 transmits and receives data to/from the cloud server and other wired and wireless PCs and systems through sensing information linked to sensing information detected by the sensor 610 and analyzed by the controller. Also, the storage 640 stores setting information for analysis and motion detection of phonemes, syllables, and sentences, and information on accent, strong note, and weak note for each phoneme, syllable, and sentence.

The controller 630 controls the sensor 610 to detect all sounds and actions representing the foreign language rhythm and analyzes and scales all sounds and actions detected by the sensor 610, including a voice recognition module 631, an motion recognition module 632 and a scoring application module 633.

Hereinbelow, the configuration of the controller 630 will be described in a greater detail.

In this Specification, a module may mean a functional and structural combination of hardware for carrying out the technical idea of the present invention and software for driving the hardware. For example, the module may mean a logical unit of a predetermined code and a hardware resource for executing the predetermined code, and it does not necessarily mean a physically connected code or a kind of hardware. The foregoing can be easily deduced by those skilled in the art.

The voice recognition module 631 includes a phoneme recognition means 631a, syllable recognition means 631b, and sentence recognition means 631c.

The phoneme recognition means 631a recognizes and analyzes the consonants and vowel sounds corresponding to the learner's phoneme motions from the sensor 610. More specifically, the phoneme recognition means 631a analyzes eight M1 to M8 corresponding to the mouth shape type and eight T1 to T8 corresponding to the tongue position type. Here, FIG. 4 is a table showing eight M1 to M8 corresponding to the mouth shape type analyzed by the phoneme recognition means 631a, and FIG. 5 is a table showing the eight T1 to T8 corresponding to the types of tongue positions analyzed by the phoneme recognition means 631a.

First, among the eight M1 to M8 corresponding to the mouth-shaped type, the vowel constituting the smallest unit of sound is a sound due to a change in mouth motion. Five mouth motions applied to vowels and three sounded by the motion of the lips among the consonants can represent a part of vowels and consonants as eight mouth shapes (M1 to M8) as shown in FIG. 4.

Here, the phoneme recognition means 631a on the basis of the eight mouth shapes appearing according to the mouth motion analyzes mouth 1 (M1) corresponding to the pronunciation 'a'; mouth 2 (M2) corresponding to pronunciations 'i' and 'e'; mouth 3 (M3) corresponding to pronunciations 'I', 'ə', 'ʌ'; mouth 4 (M4) corresponding to the pronunciation 'u'; and mouth 5 (M5) corresponding to pronunciation 'o'.

Also, the phoneme recognition means 631a analyzes mouth 6 (M6) corresponding to pronunciations 'b', 'p' and 'm' based on the motion of the lips among the consonants; mouth 7 (M7) corresponding to pronunciations 'f' and 'v'; and mouth 8 (M8) corresponding to pronunciations 's', 'z'.

Next, referring to the consonants and vowel positions in the eight T1 to T8 phoneme motions corresponding to the tongue position type, consonants among the constituent elements of the phoneme, which is the smallest unit of sound, are the sound from changing articulation point which is a position of the tongue. Vowels and consonants can be represented by the tongue position of the eight tongues that change the position of the tongue.

With respect to the eight tongue positions, the phoneme recognition means 631a analyzes tongue 1 (T1) which is a below position of "a", "o", "u", "ə", "I", which is a basic position; tongue 2 (T2) which is behind the lower teeth for "s" and "z"; tongue 3 (T3) which is end of the upper molar for "r"; tongue 4 (T4) which is the middle of the upper teeth for "I", "e", "æ"; tongue 5 (T5) which is a front portion of the upper teeth for "θ" and "d"; tongue 6 (T6) for a back portion of the upper teeth for "l"; tongue 7 (T7) which is in front of upper hard palate for "d", "t", and "n"; and tongue 8 (T8) which is back of the upper soft palate for "k", "g", and "ŋ". The syllable recognition means 631b performs analysis through recognition of syllable motion of a learner by utilizing phoneme analysis results according to the mouth shape and the tongue shape by the phoneme recognition means 631a. More specifically, one or more syllable in which phonemes are combined realizes a word that is the smallest unit of meaning. A word can be divided into "first accent" which pronounces a syllable strongly with an accent that is greater than or equal to a predetermined frequency, "second accent" which is weaker than the first accent", "syllable without strong or weak note", and "silent syllable" without sound.

Therefore, if the cerebellum is stimulated by the motions such as clapping hard and standing with two feet for the first accent and clapping hands and standing with one foot for the second accent, and a motion using a mouth and a position of the tongue, a neurotransmitter which is in charge of memorizing continuously secretes for a memory to last long. Therefore, the syllable recognition means 631b analyzes the first accent and the second accent in at least one syllable included in the words that are input from the sensor 610.

For example, referring to FIG. 15, in "Sit-u-a-tion" composed of four syllables, the third syllable "a" has the first accent, and the first syllable "sit" has the second accent. Therefore, the syllable recognition means 131b stores the motion detection setting, in the storage 640, for the second accent motion such as weak or rapid clapping or standing in one foot, and the first accent motion such as clapping hard and standing with two feet for "a" which is the first accent. Along with the mouth shape and tongue shape which are analyzed by the phoneme recognition means 631a, motions which are related to the first accent and the second accent are set to be performed by a learner at the same time, thus stimulating the cerebellum to be secreted continuously to make memory last long.

The sentence recognition means 631c performs rhythm movement setting and recognition on the sentence. More specifically, the sentences, which are the units of communication in which the words analyzed by the syllable recognition means 631b are combined, include accent for emphasis, prolonged sound, omission, abbreviation, and intonation. The sentence recognition means 631c analyzes a sentence consisting of at least one word and extracts nouns, main verbs, adjectives, and adverbs as key elements of the sentence, sets them as strong sound for emphasis, sets the functional elements as weak sounds, and stores the same in the storage 640.

The motion recognition module 632 sets so that strong note motions such as clapping hands and standing with two feet which are greater than or equal to a standard value displayed on the X, Y, Z axis or a preset decibel (dB) is recognized by the sensor 610 with respect to the strong note that is set by the sentence recognition means 631*c*, and motions such as weak clapping less than a preset decibel (dB) and standing with one foot are recognized by the sensor 610 with respect to the weak note.

The motion recognition module 632 performs a function to stimulate the cerebellum by a strong note motion and a weak note motion stored in the storage 640 along with a mouth shape and a tongue shape that are analyzed by the phoneme recognition means 631*a* so that a neurotransmitter which is in charge of memorizing continuously secretes for a memory to last long.

As illustrated in FIG. 15, "I put my hands on my knees" which is composed of seven words in one sentence includes the main verb (put) and nouns (hands, knees) which are keywords, and functional words such as a pronoun (I), possessive (my), and prepositions (on). Therefore, the motion recognition module 132 may set and detect so that strong note motions such as clapping hands and standing with two feet can be performed for the keywords put, hands, and knees, and that weak note motions such as clapping hands weak and standing in one foot can be performed for the functional words such as I, my, on, and my. Here, the sensor 610 may sense the same.

The scoring application module 633 detects a first accent motion and a second accent motion that are set by the syllable recognition means 631*b* and a strong note motion and a weak note motion that are set by the sentence recognition means 631*c* as a foreign language rhythm motion using the sensor 610. The scoring application module 633 analyzes whether recognition is performed by the sensor 610 with respect to a first motion and a second motion that respectively match a first accent and a second accent of a word composed of phonemes that are set and recognized by the phoneme recognition means 631*a* and a strong note motion and a weak note motion that respectively match a keyword and a functional word in a sentence where words are combined, and scores the same. At the time, in the scoring process, it may be analyzed and scored whether a learner performs the first accent/second accent motions that match the first accent and the second accent of a word, or strong note/weak note motions that match a keyword or a functional word of a sentence.

Thereafter, the scoring application module 633 may control the transceiver unit 620 so as to transmit the analyzed score to the management server 700, the game server 800, the cloud server 900, and other application servers through the network (N) corresponding to the wired/wireless communication network.

As another embodiment of the present invention, the scoring application module 633 connects the score to a wired/wireless network and provides information to measure and determine the score in the management server 700, the game server 800, and the cloud server 900. According to the measurement and determination by the provided information, score management, game, network competition, etc. of individual learners can be performed according to the measurement and judgment based on the provided information. Through this, motivation can be maintained, and the nature of human to pursue victory which may provoke competition can be combined with foreign language learning.

The connection method and measurement method through the network (N) include all means for connecting the same place and a separate place, including a wired/wireless dedicated server, a cloud server, and the like.

FIG. 16 is a flowchart illustrating a method of learning a motion using a motion learning device based on a foreign language rhythm motion sensor according to an embodiment of the present invention. Referring to FIG. 16, the motion learning device 600 based on the foreign language rhythm detection sensor recognizes at least one sentence and an operation from the learner by performing the operation of the sensor 610 (S110).

At this time, the sentence recognized by the motion learning device according to the embodiment of the present invention includes at least one sentence including both the language of the country where English is the mother language, and the language of the country where English is used as the second foreign language.

After the step S110, the motion learning device 600 based on the foreign language rhythm detection sensor performs phoneme analysis (S120).

That is, the motion learning device 600 based on the foreign language rhythm detection sensor recognizes and analyzes the consonant and vowel motions corresponding to the learner's phoneme motions from the sensor 610, and analyzes eight M1 to M8 corresponding to mouth shape type, and eight T1 to T8 corresponding to the tongue position type.

After step S120, the motion learning device 600 based on the foreign language rhythm detection sensor performs word analysis (S130). More specifically, the motion learning device 600 based on the foreign language rhythm detection sensor uses the results of the phoneme analysis according to the mouth shape and the tongue shape in step S120, divides the recognized word to each syllable to perform analysis, a syllable with a weak intensity, and divides a word into "first accent" to pronounce stronger with an accent greater than or equal to a preset frequency, "second accent" to pronounce weaker than the first accent, "a syllable without accent" and a "syllable without sound".

After step S130, the motion learning device 600 based on the foreign language rhythm detection sensor performs syllable motion analysis (S140). That is, the motion learning device 600 based on the foreign language rhythm detection sensor detects analyzes whether the first accent motions such as clapping hard and standing with two feet for "first accent" and the second accent motions such as clapping weak and standing with one foot for "second accent" match the first accent and the second accent in at least one syllable included in the words input from the sensor 610.

After S140, the motion learning device 600 based on the foreign language rhythm detection sensor performs a sentence analysis (S150). That is, the motion learning device 600 based on the foreign language rhythm detection sensor divides a word which is analyzed in the step (S120) into sentences which are units of communication, extract key elements of a sentence such as nouns, main verbs, adjectives, and adverbs to recognize as a strong note for emphases, and for functional elements, recognize as a weak note.

After the step (S150), the motion learning device 600 based on the foreign language rhythm detection sensor performs rhythm motion analysis (S160). That is, the motion learning device 600 based on the foreign language rhythm detection sensor determines whether, as to the strong note recognized in the step (S150), strong note motions such as clapping hands and standing with two feet which are greater than or equal to a standard value displayed on the X, Y, Z axis or a preset decibel (dB) are recognized by the sensor 610, and weak note motions such as weak clapping less than a preset decibel (dB) or less than a standard value displayed on the X, Y, Z axis and standing with one foot are recognized by are recognized by the sensor 610.

After S160, the motion learning device 600 based on the foreign language rhythm detection sensor performs scoring (S170). That is, the motion learning device 600 based on the foreign language rhythm detection sensor performs scoring according to detection of the first accent motion and the second accent motion that respectively match the first accent and the second accent within a syllable recognized according to the syllable motion analysis, and scoring according to strong note motion and weak note motion which respectively correspond to strong note and weak note in the sentence recognized according to the rhythm motion analysis in S150. Here, scoring can be performed by a sound, vibration, and motion sensor.

After S170, the motion learning device 600 based on the foreign language rhythm detection sensor performs utilization through network (S180). That is, the motion learning device 600 based on the foreign language rhythm detection sensor transmits the score information generated from S170 to a management server, a game server, a cloud server, and an application server so that a learner can perform score management, game, and network combat. Through this, motivation can be maintained, and the nature of human to pursue victory which may provoke competition can be combined with foreign language learning.

The present invention can also be embodied as computer-readable codes on a computer-readable recording medium. A computer-readable recording medium includes all kinds of recording devices in which data that can be read by a computer system is stored.

Examples of the computer-readable recording medium include a ROM, a RAM, a CD-ROM, a magnetic tape, a floppy disk, an optical data storage device and the like, and also a form of a carrier wave (for example, transmission via the Internet).

Also, the computer-readable recording medium may be distributed over network-connected computer systems so that computer-readable codes can be stored and executed in a distributed manner. In addition, functional programs, codes, and code segments for implementing the present invention can be easily inferred by programmers skilled in the art to which the present invention pertains.

Also, the motion learning device based on the foreign language rhythm motion sensor according to the present invention can be applied to a device having a motion recognition module wrist or ankle of a user in a wearable form.

It is needless to say that the embodiments illustrated in the present invention and the steps of the described method or algorithm can be visually recorded in a learning material or the like as shown in FIG. 17 through images and characters.

That is, a learning material may include a pronunciation rule unit which separates a foreign language pronunciation into a pronunciation which is separated based on a mouth shape and a pronunciation which is separated based on a tongue position; and a sentence expression unit which displays a rhythm image on a foreign language and a native language according to a pronunciation rule of the pronunciation rule unit and a preset rhythm rule; or, wherein foreign language or native language is composed of sentences where a rhythm image according to accent is displayed.

The sentence expression unit may include a foreign language expression unit in which each word that constitutes a foreign language sentence is disposed; a native language expression unit in which native language, or native language and foreign language are mixed to match the foreign language sentence; and a motion image expression unit so that the sentence disposed in the foreign language expression unit and the native language expression unit is corresponded to and matched with a rhythm image according to an accent. The sentence expression unit may further include an interpretation unit which indicates meaning of native language of a foreign language sentence.

Here, the rhythm image may be represented by at least one selected from a character font size difference, a color difference, a thickness difference of a character, and a specific shape, and the motion image may include at least one of a hand motion, a foot motion, and a body motion.

In addition, the hand motion in the motion image is a hand striking, and it is possible to express the difference of the accent by the strong hand and the weak hand mark. In the motion image, the foot motion is the foot roll, and the difference of accent can be expressed as a mark of rolling by two feet and rolling by one foot.

While the present invention have been described in connection with the exemplary embodiments illustrated in the drawings, it will be appreciated that they are merely an illustrative embodiments and various equivalent modifications and variations of the embodiments can be made by a person having an ordinary skill in the art without departing from the spirit and scope of the present invention. Therefore, the appended claims also include such modifications and variations falling within the true technical scope of the present invention.

What is claimed is:

1. A foreign language input unit for inputting a foreign language sentence comprising:
a conversion server for, after separating a foreign language sentence input from the foreign language input unit into words, separating the separated foreign language word into phonemes using predetermined pronunciation symbols, generating the phonemes corresponding to a syllable of the separated foreign language phonemes into one native language phonemes from among consonants and vowels in accordance with a predetermined pronunciation rules combining the generated native language phonemes in accordance with a foreign language combination rules to generate and display native language syllables, words, and sentences, and displaying a part of the separated foreign language phonemes not corresponding to a syllable of a foreign language word as a foreign language phoneme according to a predetermined foreign language pronunciation rule; and
a display unit for displaying at least one of the native language sentence and the inputted foreign language sentence of the conversion server on a screen,
wherein the conversion server comprises:
a foreign language word separating unit for separating input foreign language sentences into words;
a foreign language phoneme separating unit for separating each of the foreign language words separated from the foreign language word separating unit according to a predetermined foreign language phonetic symbol, and marking an accent;

a native language conversion unit for matching pronunciation of the phoneme corresponding to the syllable of the foreign language word among the foreign language phonemes separated from the foreign language phoneme separating unit to the pronunciation of one native language phoneme based on the predetermined pronunciation rule of the foreign language and the native language, and generating at the native language phoneme which is matched to the foreign language phonemes as at least one of syllables, words, and sentences of the native language based on the predetermined combination rules of a foreign language and transmitting the same to the display unit, and transmitting pronunciation of a phoneme not corresponding to a syllable of a foreign language syllable from among the separated foreign language phoneme to a display unit as a foreign language phoneme as it, is according to a predetermined pronunciation rule.

2. The foreign language reading and displaying device according to claim 1, wherein the native language conversion unit comprises:
a pronunciation rule analysis module for outputting the pronunciation of a phoneme that does not correspond to a syllable of a foreign language word to a foreign language phoneme itself among the separated foreign language phonemes, and outputting pronunciation of a phoneme not corresponding to a syllable of a foreign language syllable from among the separated foreign language phoneme to a display unit as a foreign language phoneme as it is,
a combination rule analysis module for outputting a native language syllable combined with a consonant and a vowel matched to a foreign language syllable, and
a native language output module for outputting phonemes and syllables of the native language matched to the phonemes and syllables of the foreign language output from the combination rule analysis module and transmitting the same to the display unit.

3. The foreign language reading and displaying device according to claim 2, wherein the pronunciation rule analysis module outputs one native language phoneme from among consonants and vowels of native language matched with pronunciation of the phoneme of the foreign language, outputs only pronunciation of a phoneme corresponding to a syllable of a foreign language word from among the foreign language phonemes as a native language phoneme, and outputs pronunciation of a phoneme which does not correspond to a syllable of a foreign language from among the foreign language phonemes as a foreign language phoneme itself according to a predetermined foreign language pronunciation rule.

4. The foreign language reading and displaying device according to claim 1, wherein the native language conversion unit may further include a rhythm rule analysis module that reflects the accent included in the pronunciation of the syllable of the foreign language inputted according to the predetermined rhythm rule in the native language syllable of the combination rule analysis module.

5. The foreign language reading and displaying device according to claim 4, wherein the rhythm rule analysis module is provided to reflect the accent included in pronunciation of the input foreign language syllable to a native language syllable, word, and sentence according to a predetermined rhythm rule and to transmit the same to the native language output module.

6. The foreign language reading and displaying device according to claim 2, wherein the native language output module changes at least one of a specific shape, a font size and a color of a syllable and a word to which at least one rhythm rule is reflected from among syllables of native language which is matched to an input foreign language sentence and foreign language syllable to a predetermined setting value and display the same on a screen.

7. The foreign language reading and displaying device according to claim 1, wherein the conversion server further comprises a foreign language conversion unit to transmit to the display unit a foreign language syllable portion of each foreign language word separated from the foreign language word separating unit so that the portion is displayed to be visually distinctive.

8. The foreign language reading and displaying device according to claim 1, wherein the foreign language conversion unit comprises a syllable analysis module which extracts and outputs a syllable from each foreign language word separated from the foreign language word separating unit and a foreign language output module which transmits to the display unit the extracted foreign language syllable to be displayed visually distinctive.

9. The foreign language reading and displaying device according to claim 1, wherein the display unit, when transformation of the native language and a foreign language is displayed, applies a rule which passes the conversion server as it is, and if each word is combined to show a meaning or becomes a sentence, separates the sentence to a functional word and a keyword distinctively.

10. The foreign language reading and displaying device according to claim 9, wherein the keyword is anyone of a noun, a main verb, adjective, adverb, and exclamation to which a conversion rule is applied as it is, and the functional word is anyone of a pronoun, preposition, auxiliary verb, be verb, determiner, and conjunction, and at least one of a specific shape, a font size, and a color is changed to a predetermined setting value and displayed on a screen.

11. A conversion server of the foreign language reading and displaying device comprising:
a foreign language word separating unit for separating input foreign language sentences into words;
a foreign language phoneme separating unit for separating each of the foreign language words separated from the foreign language word separating unit according to a foreign language phoneme rule for a predetermined foreign language pronunciation and marking an accent; and
a native language conversion unit for matching pronunciation of the phoneme corresponding to the syllable of the foreign language word among the foreign language phonemes separated from the foreign language phoneme separating unit to the pronunciation of one native language phoneme based on the predetermined pronunciation rule of the foreign language and the native language, and generating at the native language phoneme which is matched to the foreign language phonemes as at least one of syllables, words, and sentences of the native language based on the predetermined combination rules of a foreign language and transmitting the same to the display, and transmitting pronunciation of a phoneme which does not correspond to a syllable of a foreign language word from among the separated foreign language phoneme to the display as the foreign language phoneme itself according to a predetermined foreign language pronunciation rule, wherein the native language conversion unit comprises:
a pronunciation rule analysis module for outputting one native language phoneme from among consonants and vowels of native language matched with pronunciation of the phoneme of the foreign language according to a predetermined phonetic symbol and outputting the pronunciation of a phoneme that does not correspond to a syllable of a foreign language word to a foreign language phoneme itself among the separated foreign language phonemes, a combination rule analysis module for outputting a native language syllable combined with a consonant and a vowel matched to a foreign language syllable according to the predetermined combination rule, and a native language output module for outputting phonemes and syllables of the native language matched to the output phonemes and syllables of the foreign language and transmitting the same to the display unit.

12. The conversion server of claim 11, wherein the pronunciation rule analysis module outputs one native language phoneme from among consonants and vowels of native language matched with pronunciation of the phoneme of the foreign language, outputs only pronunciation of a phoneme corresponding to a syllable of a foreign language word from among the foreign language phonemes as a native language phoneme, and outputs pronunciation of a phoneme which does not correspond to a syllable of a foreign language from among the foreign language phonemes as a foreign language phoneme itself according to a predetermined foreign language pronunciation rule.

13. A method for reading and displaying a foreign language, the method comprising:

an inputting step of inputting a foreign language sentence;

a converting step of, after separating a foreign language sentence input from the inputting step into words, separating the separated foreign language word into phonemes using predetermined pronunciation symbols, generating the phonemes corresponding to a syllable of the separated foreign language phonemes into one native language phonemes from among consonants and vowels in accordance with a predetermined pronunciation rules, combining the generated native language phonemes in accordance with a foreign language combination rules to generate and display native language syllables, words, and sentences, and displaying a part of the separated foreign language phonemes not corresponding to a syllable of a foreign language word as a foreign language phoneme according to a predetermined foreign language pronunciation rule; and a displaying step of displaying at least one of the native language sentence generated by the converting step and the inputted foreign language sentence on a screen, wherein the converting step comprises:

a foreign language word separating step for separating the input foreign language sentences into words;

a foreign language phoneme separating step for separating each of the foreign language words separated from the foreign language word separating step into phonemes using phonetic symbol and marking an accent; and a native language converting step for matching pronunciation of the phoneme corresponding to the syllable of the foreign language word among the foreign language phonemes separated from the foreign language phoneme separating step to the pronunciation of one native language phoneme based on the predetermined pronunciation rule of the foreign language and the native language, and generating at the native language phoneme which is matched to the foreign language phonemes as at least one of syllables, words, and sentences of the native language based on the predetermined combination rules of a foreign language and transmitting the same to the display unit, and transmitting pronunciation of a phoneme not corresponding to a syllable of a foreign language syllable from among the separated foreign language phoneme to a display unit as a foreign language phoneme as it is according to a predetermined pronunciation rule.

14. The method of claim 13, wherein the native language converting step comprises:

a first step for outputting the pronunciation of a phoneme that does not correspond to a syllable of a foreign language word to a foreign language phoneme itself among the separated foreign language phonemes, and outputting pronunciation of a phoneme not corresponding to a syllable of a foreign language syllable from among the separated foreign language phoneme to a display unit as a foreign language phoneme as it is, a second step for outputting a native language syllable combined with a consonant and a vowel matched to a foreign language syllable, and a third step for outputting phonemes and syllables of the native language matched to the phonemes and syllables of the foreign language output from the first step and the second step and transmitting the same to the screen.

15. The method of claim 14, wherein the second step comprises reflecting the accent included in a pronunciation of the syllable of the foreign language input according to the predetermined rhythm rule in the native language syllable.

16. The method of claim 14, wherein the second step comprises reflecting the accent included in pronunciation of the input foreign language syllable to a native language syllable, word, and sentence according to a predetermined rhythm rule.

17. The method of claim 14, wherein the second step comprises changing at least one of a specific shape, a font size and a color of a syllable and a word to which at least one rhythm rule is reflected from among syllables of native language which is matched to an input foreign language sentence and foreign language syllable to a predetermined setting value and displaying the same on a screen.

18. The method of claim 13, wherein the converting step may further comprise a foreign language conversion step for displaying a foreign language syllable portion of each foreign language word separated in the foreign language word separating step so that the portion is displayed to be visually distinctive.

19. A non-transitory computer readable medium comprising instructions, which when executed by a processor, perform the steps according to anyone of claims 13 to 18.

* * * * *